(12) United States Patent
Ulmen et al.

(10) Patent No.: US 11,148,038 B2
(45) Date of Patent: Oct. 19, 2021

(54) LIGHTWEIGHT TRANSPORT SYSTEM

(71) Applicant: Neutron Holdings, Inc., San Francisco, CA (US)

(72) Inventors: John Ulmen, Emerald Hills, CA (US); Sanjay Dastoor, Mountain View, CA (US)

(73) Assignee: NEUTRON HOLDINGS, INC., San Francisco, CA (US)

( * ) Notice: Subject to any disclaimer, the term of this patent is extended or adjusted under 35 U.S.C. 154(b) by 0 days.

(21) Appl. No.: 16/460,681

(22) Filed: Jul. 2, 2019

(65) Prior Publication Data

US 2019/0366194 A1 Dec. 5, 2019

Related U.S. Application Data

(63) Continuation of application No. 15/598,676, filed on May 18, 2017, which is a continuation-in-part of (Continued)

(51) Int. Cl.
| A63C 17/12 | (2006.01) |
| A63C 17/01 | (2006.01) |
| A63C 17/26 | (2006.01) |
| F16H 7/02 | (2006.01) |
| F16H 7/14 | (2006.01) |
| F16H 7/08 | (2006.01) |

(52) U.S. Cl.
CPC ............ *A63C 17/12* (2013.01); *A63C 17/012* (2013.01); *A63C 17/015* (2013.01); *A63C 17/26* (2013.01); *F16H 7/023* (2013.01); *F16H 7/14* (2013.01); *A63C 2203/12* (2013.01); *A63C 2203/18* (2013.01); *A63C 2203/22* (2013.01); *A63C 2203/24* (2013.01); *F16H 2007/0842* (2013.01)

(58) Field of Classification Search
CPC ..... A63C 17/12; A63C 17/012; A63C 17/015; A63C 17/26; A63C 2203/22; A63C 2203/24; A63C 2203/12; A63C 2203/18
See application file for complete search history.

(56) References Cited

U.S. PATENT DOCUMENTS 5,020,621 A * 6/1991 Martin ................... A63C 17/01
180/180
5,067,058 A 11/1991 Standley
(Continued)

FOREIGN PATENT DOCUMENTS

WO 2006053397 A1 5/2006

OTHER PUBLICATIONS

Web image of 2010 model Arbor Axis Longboard retrieved from http://best-longboards.blogspot.com/2011/09/best-buy-arbor-axis-bamboo-complete.html, image posted on Sep. 3, 2011.

*Primary Examiner* — Erez Gurari
(74) *Attorney, Agent, or Firm* — Dentons US LLP

(57) ABSTRACT

A personal conveyance including a flexible substrate, a wheel and an electric motor mounted to a first wheel assembly, the wheel rotatably supported by the first wheel assembly and the electric motor configured to drive the wheel, wherein the first wheel assembly is mounted to the flexible substrate, a battery mounted to the flexible substrate and configured to power the electric motor, and a processor configured to control operation of the electric motor.

16 Claims, 18 Drawing Sheets

Related U.S. Application Data application No. 13/645,388, filed on Oct. 4, 2012, now abandoned.

(60) Provisional application No. 61/542,810, filed on Oct. 4, 2011.

(56) References Cited

U.S. PATENT DOCUMENTS

| | | | |
|---|---|---|---|
| 5,119,277 A | 6/1992 | Copley et al. | |
| 5,330,026 A | 7/1994 | Hsu et al. | |
| 5,487,441 A * | 1/1996 | Endo | A63C 17/004 180/181 |
| 5,676,218 A | 10/1997 | Hirose | |
| 5,782,709 A | 7/1998 | Greimann | |
| 5,833,252 A * | 11/1998 | Strand | A63C 17/0033 280/87.042 |
| 5,864,333 A | 1/1999 | O'Heir | |
| 5,870,025 A * | 2/1999 | Hinohara | H01M 10/48 340/636.12 |
| 5,893,425 A * | 4/1999 | Finkle | A63C 17/01 180/180 |
| 5,927,420 A | 7/1999 | Karrington | |
| 6,050,357 A | 4/2000 | Staelin et al. | |
| 6,074,271 A | 6/2000 | Derrah | |
| 6,646,547 B2 * | 11/2003 | Chiu | G08B 5/004 280/87.042 |
| 6,796,394 B1 | 9/2004 | Lin | |
| 6,802,636 B1 | 10/2004 | Bailey, Jr. | |
| 6,901,872 B1 | 6/2005 | Battle et al. | |
| 7,077,414 B1 | 7/2006 | Kertes | |
| 7,147,235 B2 | 12/2006 | West | |
| 7,275,607 B2 | 10/2007 | Kamen et al. | |
| 7,293,622 B1 | 11/2007 | Spital | |
| 7,445,069 B2 | 11/2008 | Negoro et al. | |
| 7,458,435 B2 | 12/2008 | Negoro et al. | |
| 8,061,725 B1 | 11/2011 | Hawkins | |
| 8,210,304 B2 | 7/2012 | Baldwin | |
| 8,306,673 B1 | 11/2012 | Manning | |
| 9,607,506 B1 * | 3/2017 | Manning | A63C 17/12 |
| 2002/0167415 A1 * | 11/2002 | Rains | A63C 17/26 340/665 |
| 2002/0170763 A1 | 11/2002 | Townsend | |
| 2003/0185019 A1 | 10/2003 | Rogers et al. | |
| 2003/0201620 A1 | 10/2003 | Seelye | |
| 2004/0007399 A1 * | 1/2004 | Heinzmann | B60L 58/22 180/7.1 |
| 2004/0079571 A1 | 4/2004 | Laver et al. | |
| 2004/0100055 A1 | 5/2004 | Chang | |
| 2004/0163867 A1 * | 8/2004 | Hillman | A63C 17/12 180/180 |
| 2005/0006158 A1 | 1/2005 | Tsai | |
| 2006/0032682 A1 | 2/2006 | Hillman et al. | |
| 2006/0170174 A1 | 8/2006 | Hiramatsu | |
| 2007/0272465 A1 * | 11/2007 | Su | A63C 17/014 180/181 |
| 2008/0036165 A1 | 2/2008 | Reinson | |
| 2009/0236811 A1 * | 9/2009 | Lewis | A63C 17/26 280/87.042 |
| 2012/0116714 A1 * | 5/2012 | Rogel | A63B 71/06 702/150 |
| 2012/0140510 A1 * | 6/2012 | Khan | A63C 17/26 362/545 |
| 2012/0318600 A1 | 12/2012 | Hakamata et al. | |
| 2013/0081891 A1 * | 4/2013 | Ulmen | A63C 17/12 180/181 |
| 2013/0206493 A1 * | 8/2013 | Larson | A63C 17/012 180/181 |
| 2014/0027192 A1 * | 1/2014 | King | A63C 17/0006 180/181 |
| 2015/0297975 A1 * | 10/2015 | DiCarlo | A63C 17/12 180/180 |
| 2016/0059108 A1 * | 3/2016 | Demolder | A63C 17/12 701/22 |
| 2016/0175693 A1 * | 6/2016 | Page | A63C 17/26 280/87.042 |
| 2016/0256767 A1 * | 9/2016 | Cerboneschi | A63C 17/017 |
| 2017/0144056 A1 | 5/2017 | Evans et al. | |
| 2017/0190335 A1 * | 7/2017 | Gillett | A63C 17/12 |
| 2017/0252638 A1 * | 9/2017 | Ulmen | A63C 17/015 |
| 2018/0236348 A1 * | 8/2018 | Evans | A63C 17/223 |
| 2018/0250581 A1 * | 9/2018 | Lemire-Elmore | A63C 17/015 |
| 2018/0257486 A1 * | 9/2018 | Noble Nava | B60B 19/12 |
| 2018/0278190 A1 * | 9/2018 | Cerboneschi | H02P 6/04 |
| 2018/0318698 A1 * | 11/2018 | Ji | A63C 17/223 |
| 2019/0015731 A1 * | 1/2019 | Doerksen | B60L 50/52 |

\* cited by examiner

LIGHTWEIGHT TRANSPORT SYSTEM

CROSS-REFERENCE TO RELATED APPLICATIONS

This application claims the benefit under 35 USC 120 as a continuation of U.S. application Ser. No. 15/598,676, filed May 18, 2017, titled "LIGHTWEIGHT TRANSPORT SYSTEM," which claims the benefit under 35 USC 120 as a continuation-in-part of U.S. application Ser. No. 13/645,388, filed 4-OCT.-2012, which claims the benefit of U.S. Provisional Application No. 61/542,810, filed 4-OCT.-2011, which are each incorporated in their entirety by this reference.

TECHNICAL FIELD

This invention relates generally to the personal transportation field, and more specifically to a new and useful personal transport vehicle in the personal transportation field.

BACKGROUND

Low-emission personal vehicles are becoming an increasingly popular means of transport. However, many of the existing solutions to personal transportation are large and bulky. The size of these solutions limits the mobility of a user, as the user cannot easily take the vehicle onto another mode of transportation, such as a train. Smaller conventional personal transport solutions, such as skateboards and bicycles, lack the range and speed bestowed by a motorized vehicle. Existing small personal transport solutions, such as electric skateboards, suffer from a lack of performance due to the stiffness of the drive train components and/or drastically limit the flexibility of use due to obstacles on the riding surface formed by drive train components.

Thus, there is a need in the personal transport field to create a new and useful high performance, mobile personal transport vehicle.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
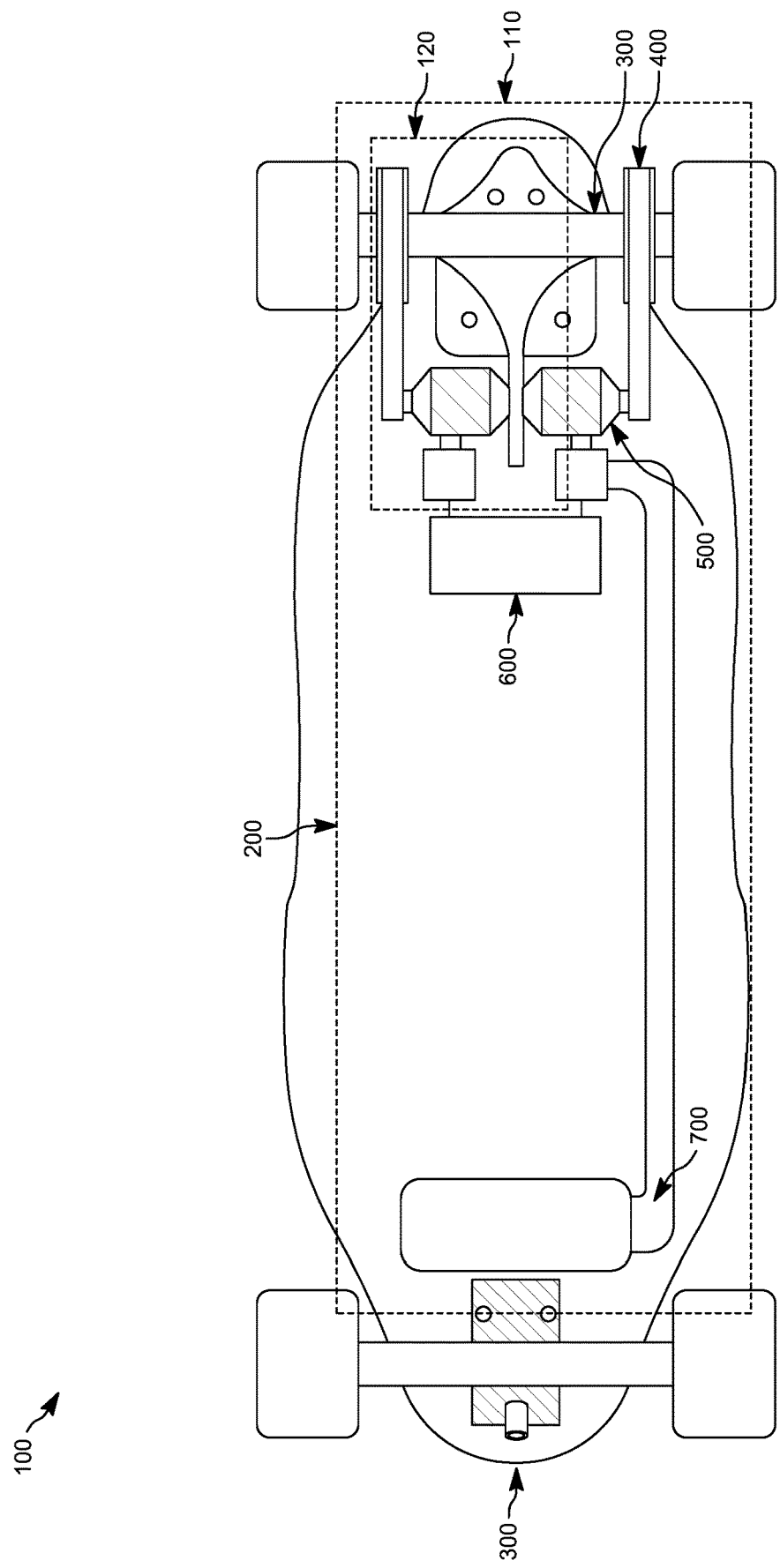
FIG. 1 is a schematic representation of a variation of the personal transport vehicle.

As shown in FIG. 1, the personal transport vehicle (e.g., personal conveyance) 100 includes a support surface 200 (e.g., flexible substrate) and a drive train 110 coupled to the support surface 200. The drive train 110 includes a truck 300 supporting a wheel, a motor 500 configured to drive the wheel, a processor 600 configured to control motor operation, and an energy storage device 700 configured to provide power to the motor 500. The personal transport vehicle 100 preferably additionally includes a control input 800 that provides a control signal 802 to the processor 600, and a peripheral connector 810 that provides a data and/or power interface between the personal transport vehicle and other systems. The personal transport vehicle 100 is preferably used to transport a user 10 (e.g. a rider), wherein the user 10 is preferably supported by the support surface 200 and moved by the drive train 110. The personal transport vehicle 100 preferably supports a standing user 10, but alternatively support a prone user 10, sitting user 10, or can support the user 10 in any suitable position. The personal transport vehicle 100 is preferably a skateboard, but can alternatively be a scooter, skate, or any other suitable personal transport vehicle 100. This personal transport vehicle 100 can confer the benefits of a motorized means of transport while maintaining the ride and performance characteristics of a skateboard, such as unrestricted movement over the surface of the support surface 200 and flexibility and/or responsiveness of the support surface 200. The flexibility of the support surface 200 can be maintained by mounting all the stiff components of the vehicle to the trucks, mounting all or some of the stiff components adjacent the trucks and distal the lateral centerline of the support surface (e.g. the stiff components do not extend across the centerline), or through any other suitable means. The ride and performance of the skateboard are preferably further maintained by ensuring that the electrical components of the vehicle do not substantially touch or interfere with a substantially flat ground surface when the center of support surface is deformed to contact the ground surface. The personal transport vehicle 100 can be manufactured as a unit, including the support surface 200 and drive train 110, or can be manufactured and sold as a retrofit kit for a conventional deck that includes only the drive train 110. When mounting the drive train 110 to a conventional deck, additional mounting holes preferably do not need to be created.

Figure 5A:
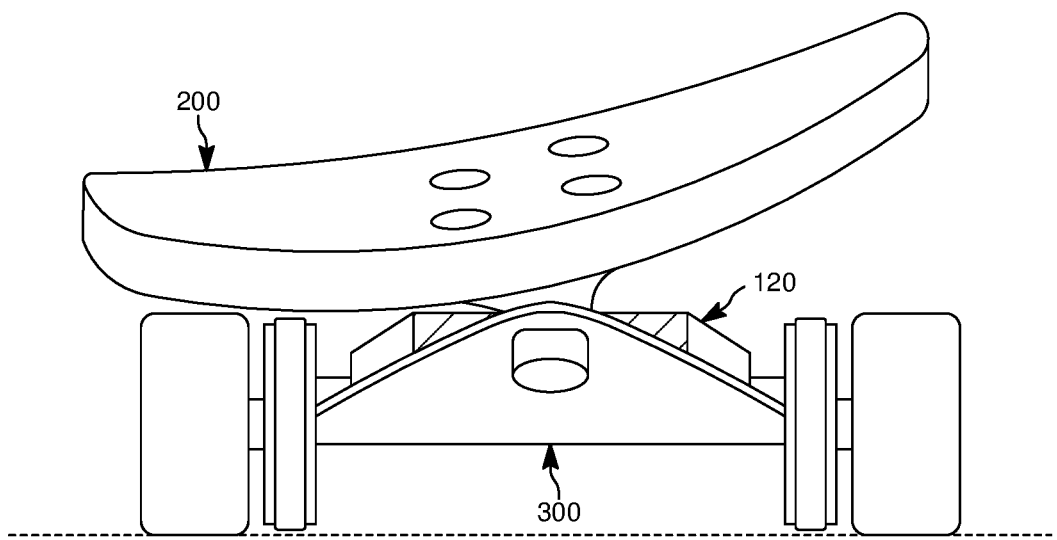
FIGS. 5A, 5B, and 5C are end-on views of a variation of the personal transport vehicle steering to the left, straight, and right, respectively.
Figure 5B:
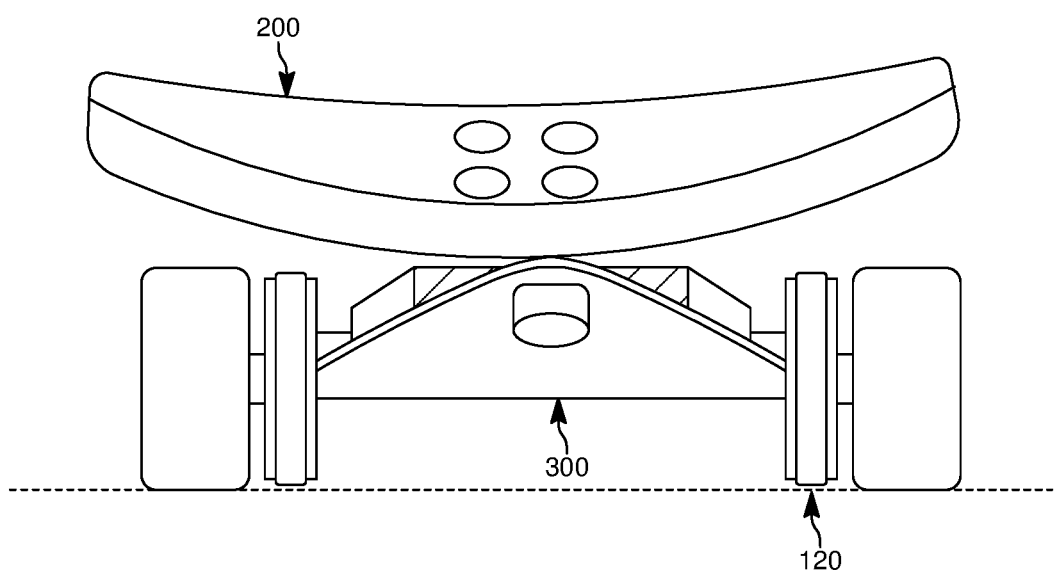
Figure 5C:
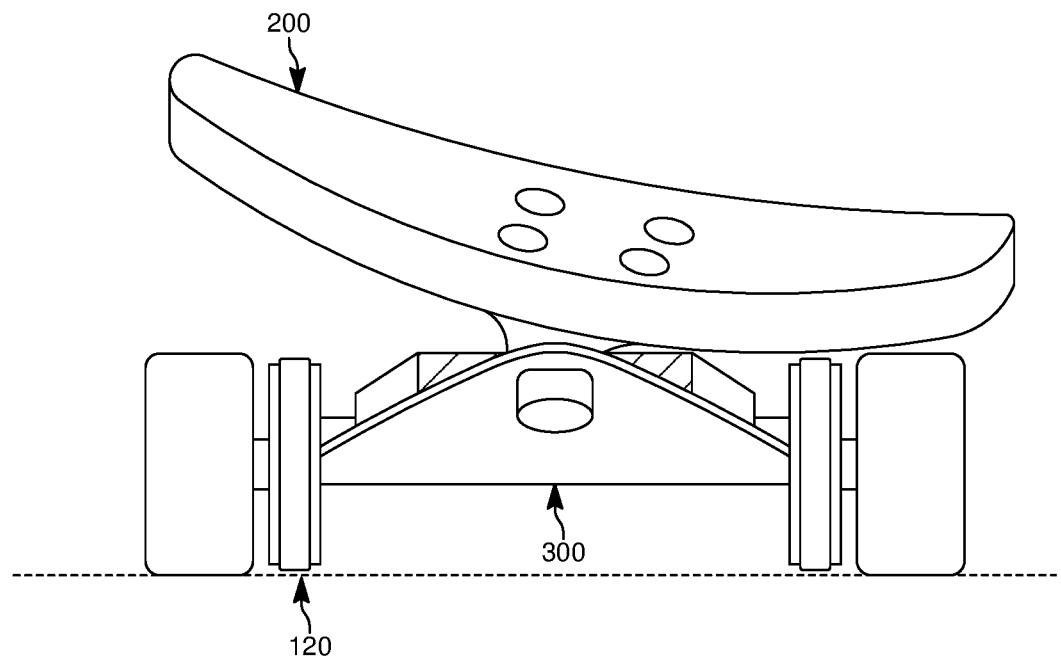

In operation, the drive train 110 preferably drives at least one vehicle wheel 420 to move the vehicle 100 over a road surface 20. Alternatively, the user 10 can manually propel the vehicle 100 over the road surface 20. The user 10 preferably controls the velocity of the vehicle 100 through the control input 800, but can alternatively control the vehicle velocity manually (e.g. by pushing the vehicle 100 to accelerate or dragging a foot to slow down). As shown in FIGS. 5A-5C, the vehicle 100 is preferably steered based on the weight distribution between the two longitudinal sides of the support surface 200, wherein increased weight on a given side preferably turns the vehicle 100 toward said side. Alternatively, the vehicle 100 can be steered through a steering mechanism 110, such as a set of handlebars, a steering wheel, or any other suitable steering mechanism 110.

Figure 2:
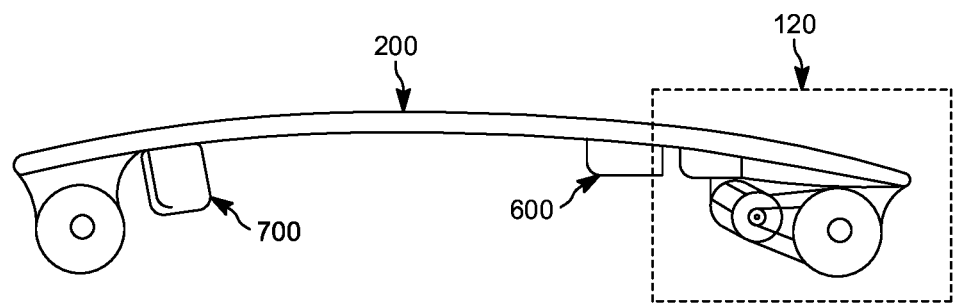
FIG. 2 is a side view of a variation of the personal transport vehicle.
Figure 3:
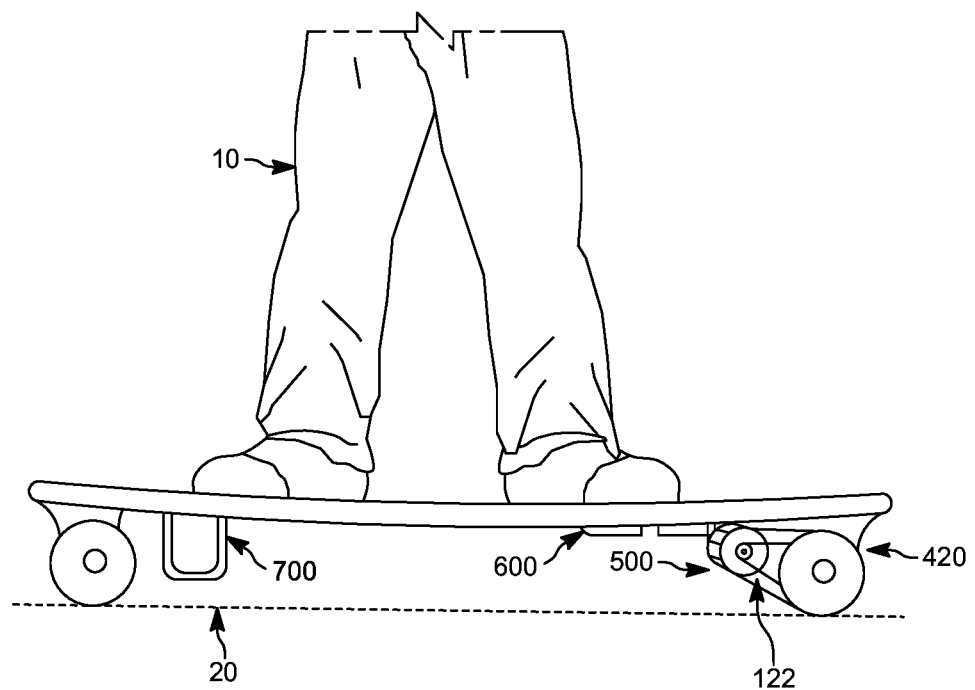
FIG. 3 is a side view of a variation of the personal transport vehicle with a user.
Figure 6:
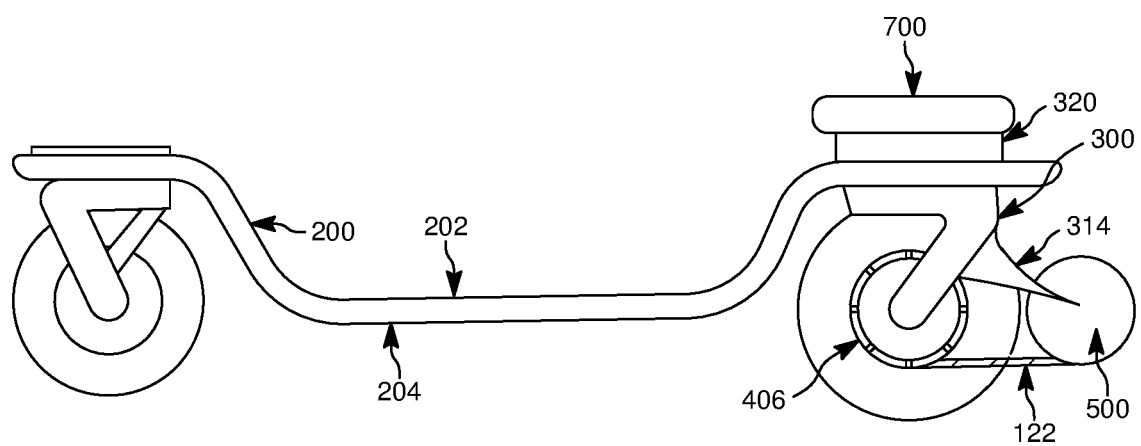
FIG. 6 is a schematic representation of a variation of the personal transport vehicle.

As shown in FIGS. 1 to 3, the support surface 200 (e.g. deck) of the personal transport vehicle 100 functions to support the rider. The support surface 200 preferably has a first broad face configured to support the rider (riding surface 202), and a second broad face (bottom surface 204) opposing the first broad face. The support surface 200 preferably includes two sets of mounting points to which the drive train 110 can be mounted, one on each end of the support surface 200, but can alternatively include any suitable number of coupling mechanisms to couple with the drive train 110. The support surface 200 is preferably flexible, but can alternatively be substantially stiff. In one variation, the support surface 200 can deflect more than one inch. In another variation, the support surface 200 can deflect enough to contact a flat surface between the front and rear wheels. In both variations, the deflection preferably does not incur any significant damage that would reduce the functionality of the support surface 200. In particular, personal transport vehicle components attached directly and/or indirectly to the support surface are preferably separated from the ground by a finite (e.g., non-zero) distance, irrespective of the degree of flexion of the support surface, within a range of degrees of flexion that are non-destructive to the support surface 200 (e.g., flexion of the support surface due to typical usage by a human rider within a typical range of weights and riding behaviors). The support surface 200 is preferably cambered, and can have a positive camber or a negative camber; however, the support surface 200 can be flat, be a rocker deck, or be otherwise configured. The support surface 200 can be cambered about a longitudinal centerline 201 and/or a lateral (e.g., medial) centerline 203, or any other suitable axis. Additionally or alternatively, the support surface 200 can be a dropped deck 200, as shown in FIG. 6, wherein a plane extending through the majority of the support surface 200 body is offset from a plane extending between the support surface ends. The support surface 200 is preferably a conventional skateboard deck 200, more preferably a longboard deck 200, but can alternatively be a scooter deck 200, a skate, or any other suitable surface capable of supporting a user 10. The support surface 200 is preferably flexible, but can alternatively be substantially stiff. Examples of support surfaces 200 that can be used include: soft boards (e.g., cruising boards), soft/medium boards (e.g., freestyle boards), medium/stiff (e.g., free ride boards), stiff (e.g., downhill boards); sag or drop more than 40%, 30%, 20%, 10%, 5%, or any suitable proportion of the unloaded height after loading; sag or drop less than 40%, 30%, 20%, 10%, 5%, or any suitable proportion of the unloaded height after loading; or have any other suitable flexion.

Figure 8:
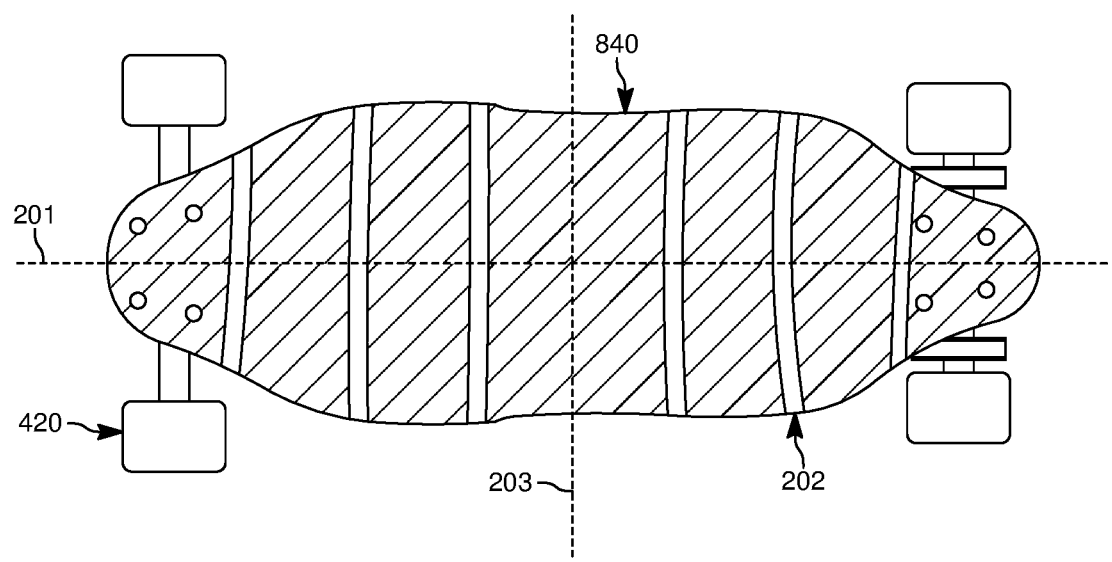
FIG. 8 is a top view of a variation of the personal transport vehicle with a force sensor control input.

As shown in FIG. 8, the support surface 200 preferably defines a longitudinal axis extending along the support surface in a first direction and a medial axis (e.g., lateral axis) extending along the support surface in a second direction, wherein the medial axis is preferably perpendicular to the longitudinal axis. However, the support surface 200 can define any other suitable axes, planes, vectors, or other inherent references with any other suitable relative angular relationship. In a first variation, the support surface 200 is substantially symmetric (e.g., in mass distribution, etc.) about the longitudinal and medial axes. In a second variation, the support surface 200 is substantially symmetric about the longitudinal axis only. In a third variation, the support surface is substantially symmetric about the medial axis only. In a fourth variation, the support surface 200 is symmetric about neither the longitudinal nor the medial axes. However, variations of the support surface 200 can be asymmetric or have any suitable degree of symmetry about any suitable axes.

Figure 4:
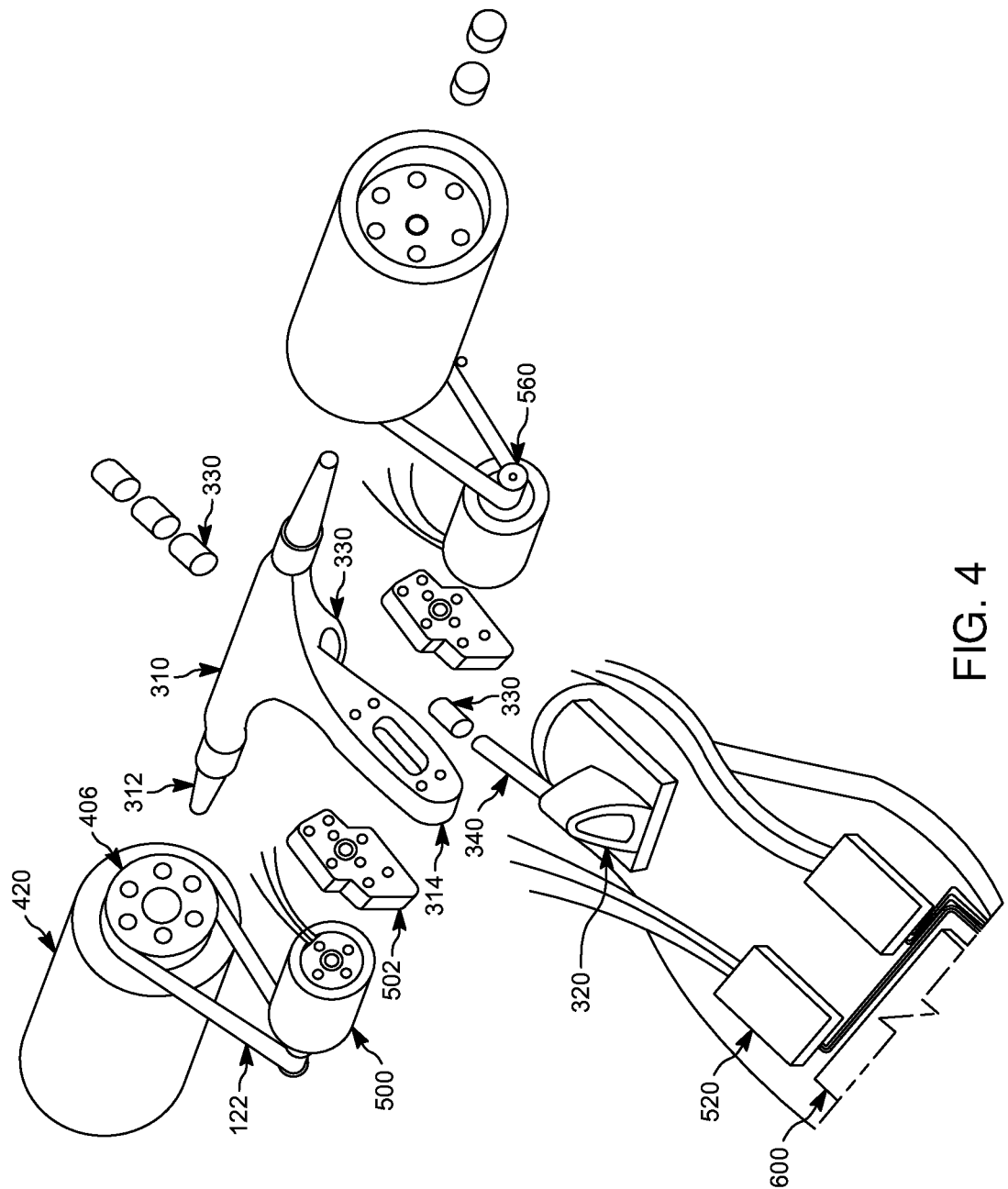
FIG. 4 is an exploded view of a variation of the personal transport vehicle.

As shown in FIG. 1, the drive train 110 of the personal transport vehicle 100 functions to generate power and move the personal transport vehicle 100 over a road surface 20. The drive train 110 is preferably mounted to the support surface 200, but can alternatively be otherwise fastened to the support surface 200. When a single drive train 110 is used (e.g. wherein all the motors 500 of the vehicle 100 are located on a single truck 300), the drive train 110 is preferably mounted on the front end of the support surface 200, but can alternatively be mounted to the rear end of the support surface 200. As shown in FIG. 4, the drive train 110 preferably includes a truck 300; an energy storage device 700; a power train 120 including a wheel bearing 400, supported by the truck 300, and a motor 500; and a processor 600 that controls motor operation. However, the drive train 110 can include any suitable number of trucks 300, energy storage devices 700, motors 500, and processors 600. The drive train 110 preferably includes two sets of coaxial wheels 420, but can alternatively have one balancing wheel 420, two inline wheels 420, two coaxial wheels 420, or any other suitable number of wheels 420. The drive train 110 can alternatively include tracks (e.g. snow or off-road tracks), an impeller, or any other suitable drive mechanism. Drive train operation is preferably controlled by the processor 600, based on a signal 802 received from a control input 800. However, the drive train 110 can be controlled by any suitable means. The drive train 110 is preferably mounted to the support surface 200 such that the support surface flexibility is substantially maintained. In one variation of the vehicle 100, some or all of the drive train 110 components having broad mounting faces, such as the energy storage device 700 and the electronics (e.g. the processor 600 and motor controller 520), are substantially flexible. In another variation of the vehicle 100, the drive train 110 components are mounted adjacent to the support surface ends and distal from the support surface 200 center. In another variation of the vehicle 100, the drive train 110 components are statically fixed to less than 50% of a support surface broad face, more preferably to less than 30% of the support surface broad face. However, any suitable configuration of the drive train 110 components can be used.

The truck 300 of the drive train 110 functions to mount the wheels 420 to the support surface 200. In doing so, the truck 300 (e.g., member, skateboard truck, wheel assembly, translation assembly, transport assembly) preferably rotatably supports the wheel bearings 400. The truck 300 can additionally function to support the motor 500, the energy storage device 700, the processor 600, and/or any other suitable drive train 110 component. The truck 300 can additionally function as a heat sink. The truck 300 preferably includes a hangar 310 that supports the wheel bearings 400, a base plate 320 that mounts the truck 300 to the support surface 200, bushings 330, and a kingpin 340 that extends through the bushings 330 to mount the hangar 310 to the base plate 320. The truck 300 can additionally include risers 350 that can be inserted between the base plate 320 and the support surface 200 to adjust the distance between the truck 300 and the support surface 200. The drive train 110 preferably includes two trucks 300, each mounted to an opposing end of the support surface 200 and oriented with the respective axle perpendicular to the longitudinal axis of the support surface 200, but can alternatively include a single truck 300 or any other suitable number of trucks 300 mounted at any suitable position and angle relative to the support surface 200 longitudinal axis.

The hangar 310 of the truck 300 functions to connect the axle 312 to the base plate 320 of the truck 300. The hangar 310 can additionally function to mount the motor 500 and/or the energy storage device 700. However, the hangar 310 can be a standard hangar 310, or include any other suitable mounting or coupling mechanisms. The hangar 310 preferably includes two coaxial axles extending in opposite directions from the hangar body, wherein the axles 312 function to support the wheel bearing 400. The wheel bearings 400 are preferably rotatably coupled to the axle 312, such that the wheels 420 (e.g., translation mechanism) freely rotate about the axle 312. The wheel bearings 400 are preferably retained on the axle 312 by an axle nut, cotter pin, or other suitable fastening device. The hangar 310 preferably includes a mounting arm 314 extending from the hangar body to which the motor 500, battery 702, motor controller 520, processor 600, and/or any other suitable electronic component is mounted, wherein the arm is preferably centered between the axles 312 but can alternatively be offset from the truck center. The mounting arm 314 preferably extends perpendicularly relative to the axles 312, and extends at an angle from the hangar body. However, the mounting arm 314 can be the hangar body, or extend from the hangar body at any suitable angle. The mounting arm 314 preferably includes at least one mounting hole or clip, and can include one or more slots extending longitudinally along the arm length, a series of mounting holes, grooves, or any other suitable adjustable mounting feature.

The bushing 330 functions to dampen vehicle 100 vibrations during vehicle use, and can function similar to a suspension system. However, the vehicle 100 can additionally and/or alternatively include a separate suspension system, such as a pneumatic suspension system, hydraulic suspension system, or any other suitable suspension system. Each truck 300 preferably includes two bushings 330, wherein the first bushing 330 is preferably located between the base plate 320 and the hangar 310, and the second bushing 330 is preferably located between the kingpin 340 and the hangar 310. The bushing 330 can be conical, stepped, barrel, or have any other suitable shape. The bushing 330 can be of any suitable durometer. Alternatively, the bushing 330 can have an adjustable durometer, wherein the bushing 330 durometer can be adjusted based on the desired ride characteristics, determined vehicle 100 vibration (e.g. increased to increase vehicle 100 stability/dampen vibration, decreased when less vibration is sensed to increase vehicle 100 responsiveness, etc.), or adjusted based on any other suitable parameter. In this variation, the bushing 330 can be made of a material that changes stiffness dependent on the magnitude and/or direction of an applied electric current, wherein the processor 600 preferably controls the amount of current applied to the bushing 330. However, the bushing 330 durometer can be adjusted in any suitable manner.

The base plate 320 of the truck 300 functions to couple the hangar 310 to the support surface 200. The base plate 320 can additionally function as a heat sink for the electronic components of the drive train 110. The base plate 320 is preferably configured to mount to the bottom surface 204 of the support surface 200, but can alternatively mount to the riding surface 202, wherein the hangar 310 extends through the support surface 200 (e.g. a dropped truck 300 configuration). The base plate 320 preferably includes mounting features, such as screw holes, longitudinal slots, or grooves, but can alternatively include any suitable coupling feature. The base plate 320 can additionally include component-mounting features, such as screw holes, longitudinal slots, or grooves to which the motor 500 and/or battery 702 can mount. The base plate 320 is preferably a substantially solid piece of metal, but can alternatively be a hollow metal box that can function to store the electronic components of the drive train 110, be a solid plastic piece, or have any suitable configuration or be made of any suitable material.

The energy storage device 700 (e.g., power supply, power source) of the drive train 110 functions to provide power to the motor 500, and can additionally power the processor 600 and/or the control input 800. The energy storage device 700 is preferably a battery 702, more preferably a battery including a plurality of cells, but can alternatively be a fuel storage device or any other suitable device capable of storing energy in electrical, chemical, or mechanical form. The battery 702 preferably includes a plurality of prismatic cells stacked along the cell thicknesses, but can alternatively include a plurality of prismatic cells arranged in a single layer. The battery 702 is preferably a rechargeable battery 702, more preferably a battery 702 having lithium chemistry (e.g. lithium ion, lithium ion polymer, other lithium-based compounds, etc.) but can alternatively be a battery 702 having any suitable chemistry. The battery 702 is preferably substantially flat and prismatic, but can alternatively be cylindrical or have any suitable form factor. The energy storage device 700 is preferably mounted to or coupled near the truck opposing that to which the motor 500 is mounted to achieve a more uniform weight distribution over the support surface (e.g., of the components; 50:50, 60:40, etc.), but can alternatively be mounted or coupled adjacent to the truck to which the motor 500 is mounted. The energy storage device 700 is preferably electrically connected to the motor 500 by one or more flexible wires (e.g., extending along the top or bottom of the support surface 200, beneath the deck tape, etc.), and can additionally be electrically connected by a flexible connection to the processor 600. The electrical connections are preferably fastened against the support surface 200 or integrated into the truck 300, but can alternatively be unrestrained. When the energy storage device 700 is mounted proximal to a different truck than the motor 500, the electrical connections can extend along the riding surface, wherein the electrical connections preferably extend from the energy storage device to the riding surface through holes through the support surface, extend along the riding surface, and electrically contact the energy storage device 700 and motor 500 through holes through the support surface. However, the electrical connections can alternatively extend along the bottom surface, or within the interior of the support surface (e.g., inside a thickness of the support surface). The electrical connections can include braided cable sleeving or any other suitable sleeving to facilitate electrical connection flexion with the support surface 200. The electrical connections can be arranged between the grip tape and the riding surface of the support surface 200 or can be located in, on, or at any other suitable portion of the vehicle 100.

The energy storage device 700 is preferably movably coupled to the support surface 200, but can alternatively be rigidly fixed to the support surface 200. The energy storage device 700 is preferably mounted on a truck 300 (power truck), more preferably on the base plate 320 of a truck 300, but can alternatively be mounted on the hangar 310 of the truck 300 or integrated into any suitable portion of the truck 300 such that the energy storage device 700 can move relative to the support surface 200. When mounted to the base plate 320, the energy storage device 700 is preferably mounted to the broad face of the base plate 320 distal the support surface 200, but can alternatively be mounted to the broad face adjacent the support surface 200. A broad face of the energy storage device 700 is preferably mounted against the broad face of the base plate 320, but the edge of the energy storage device 700 can alternatively be mounted on the base plate 320, leaving the remainder of the energy storage device 700 free. The energy storage device 700 is preferably fastened to the truck 300 (e.g. using fasteners, such as screws, tie downs, etc.), but can alternatively be adhered or otherwise mounted to the truck 300. The energy storage device 700 can alternatively be used as or be mounted to the riser 350, wherein all or a portion of the energy storage device 700 is mechanically retained between the support surface 200 and the hangar 310. The truck to which the energy storage device 700 is mounted is preferably the rear truck, but can alternatively be mounted to the front truck of the vehicle. However, the energy storage device 700 can be movably supported by the support surface 200. In this variation, the energy storage device 700 is preferably coupled to the bottom surface 204, adjacent to a truck 300, such that the energy storage device 700 does not substantially impede support surface flexion. The energy storage device 700 is preferably coupled to the support surface 200 between the truck 300 and the support surface end, but can alternatively be coupled within the support surface area defined between the two trucks 300. The energy storage device 700 is preferably suspended from the support surface 200, such that the energy storage device 700 is decoupled in shear force from the support surface 200 and can shift or slide relative to the board. The energy storage device 700 is preferably suspended from the support surface 200 by a flexible suspension mechanism 701, such as a fabric net, a flexible casing such as a flexible plastic or fabric casing, or any other suitable flexible suspension mechanism. Alternatively, the energy storage device 700 can be suspended by a substantially stiff suspension mechanism, such as a substantially rigid box, wherein the energy storage device position within the stiff suspension mechanism can be retained by flexible dampeners within the suspension mechanism that permit board flexion relative to the energy storage device 700, such as rubber washers. Alternatively, the energy storage device 700 can be movably supported by the board by mounting an edge of the energy storage device 700 adjacent the truck 300 to the deck 200, such that the remainder of the energy storage device 700 is substantially free from the deck 200. The energy storage device 700 can alternatively be integrated into the support surface 200, such that the energy storage device 700 is preferably disposed between the riding surface and bottom surface, but can alternatively define one of said surfaces. However, the energy storage device can be rigidly mounted to the board, wherein an entire broad face of the energy storage device 700 is preferably coupled to the bottom surface 204. The energy storage device 700 can alternatively be supported by any other means by any other suitable vehicle component.

In a specific example, the energy storage device (e.g., power supply) is mounted to the bottom surface by way of a flexible housing. In this and related examples, the flexible housing further comprises a set of light emitters and a button, and is operable between several operating modes including a power notification mode. In the power notification mode, depressing the button controls a number of the set of light emitters to emit light, wherein the number is proportional to an instantaneous energy level of the power supply (e.g., to notify a user of the vehicle the approximate energy level of the vehicle power supply).

The power train 120 of the drive train 110 functions to generate rotational power to drive a wheel 420, thereby propelling the vehicle 100 along a road surface 20. The power train 120 preferably drives one wheel 420, but can alternatively drive multiple wheels 420. The vehicle 100 preferably includes a first and second power train 120 driving a first and second wheel 420, respectively, wherein the first and second wheels 420 are preferably supported by a single truck 300. The vehicle 100 can alternatively include a single power train 120 driving a single wheel 420, a single power train 120 driving two wheels 420 supported by a singular truck 300 or by separate trucks 300, four power trains 120 individually driving four respective wheels 420, or include any suitable number of power trains 120 driving any suitable number of wheels 420.

The power train 120 preferably includes a wheel bearing 400 and a motor 500, wherein the motor 500 drives the wheel 420 through direct mechanical connection of drive components to the wheel 420 or drives the wheel 420 by driving the wheel bearing 400. The motor 500 can drive any suitable portion of the wheel, such as the wheel body. The power train 120 is preferably a positive drive, wherein the wheel bearing 400 includes a toothed wheel pulley 406 (gear), the motor 500 includes a toothed motor pulley 560 (gear) that rotates with the motor 500 shaft, and the power train 120 includes a toothed belt 122 or chain that passes around the wheel and motor pulleys. However, the power train 120 can be a negative drive, wherein the bearing and motor pulleys are smooth pulleys; a direct drive; a shaft drive; an offset parallel shaft drive; a gear transmission (e.g. a planetary gear drive), or have any other suitable power train configuration. The wheel pulley 406 is preferably located on the wheel bearing 400, but can alternatively be located on a separate component statically or movably coupled to the wheel 420. The wheel pulley is preferably substantially the same size as, or slightly smaller than, the motor pulley (e.g. 25% smaller), but can alternatively be any suitable size relative to the motor pulley. The power train is preferably located on a single truck (drive truck), but can alternatively be distributed between two trucks. The truck to which the power train is mounted is preferably the front truck of the vehicle, but can alternatively be the rear truck.

Figure 7:
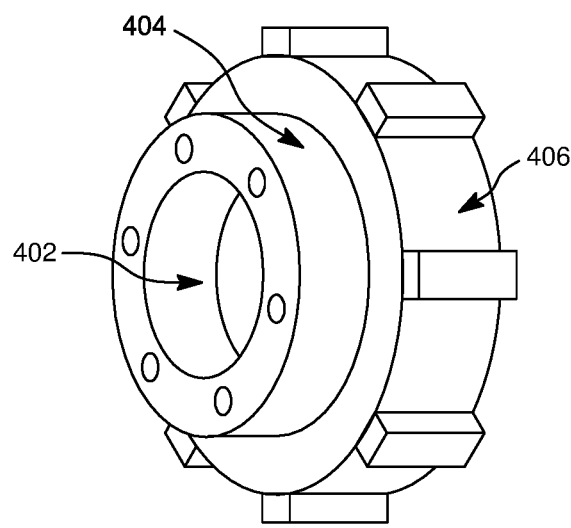
FIG. 7 is a schematic representation of a variation of the wheel bearing.

The wheel bearing 400 of the power train 120 functions to rotatably mount a wheel 420 to the axle 312. The wheel bearing 400 preferably includes an inner bearing surface 402 that rotatably mounts to the axle 312 and an outer bearing surface 404 that mounts to the wheel 420. The wheel bearing 400 can additionally include a third bearing surface that functions as a motor interface. The third bearing surface can be a smooth pulley, a toothed wheel pulley 406 (as shown in FIG. 7), a gear, or any other suitable component capable of transferring rotational energy from the motor 500. The third bearing surface is preferably coaxial with the inner and outer bearing surfaces 404, and is preferably located on the side of the wheel bearing 400 configured to mount proximal the hangar 310 of the truck 300. However, the third bearing surface can be axially offset from the inner and outer bearing surfaces. The wheel bearing 400 can be a shielded bearing, sealed bearing, Teflon-sealed bearing, rubber-sealed bearing, ceramic bearing, or any other suitable bearing.

The motor 500 of the power train 120 functions to generate the rotational force that rotates the wheel 420. The motor 500 can additionally function to generate energy, such as during controlled deceleration (e.g. braking). The motor 500 is preferably an electric motor, more preferably a permanent magnet motor, but can alternatively be a brushed DC motor, a brushless DC motor, a switched reluctance motor, a coreless DC motor, a synchronous AC motor, an induction motor, a stepper motor, or any other suitable electric motor. The motor 500 can alternatively be any other suitable rotary drive means. The motor 500 is preferably supported by the truck 300, and is preferably mounted to the hangar 310, but can alternatively be mounted to the base plate 320, integrated into the hangar 310 or base plate 320, or otherwise supported by the truck 300. The motor 500 can also be supported by a plate extending from the truck 300, between the wheel and the motor 500, such that the motor is supported on a first end by the hangar and on a second end by the plate. However, the motor can be otherwise mounted to the truck. The motor 500 is preferably supported by or located adjacent the truck 300 that supports the driven wheel 420, but can alternatively be supported by or located adjacent a separate truck 300. The motor 500 preferably includes a substantially waterproof housing, but can alternatively have an open housing, partially open housing (e.g., a housing including orifices), or any other suitable housing.

The power train 110 can additionally include a tensioning mechanism that functions to control the belt tension of the positive drive. In one variation of the power train 120, the tensioning mechanism includes the motor 500, wherein the motor 500 is preferably adjustably mounted to the truck 300, wherein the motor position relative to the axle 312 and/or wheel bearing 400 can be adjusted. Adjustment of the motor position can be used to adjust the belt tension of the positive drive power train 120. The motor 500 is preferably adjustably mounted to the truck 300 by slotted mounting plates 502, wherein fasteners (e.g. bolts, screws, or pins) extend through the slots to couple to the truck 300. The motor 500 is preferably statically fixed to the mounting plates 502, wherein sliding of the mounting bracket 502 relative to the mounting arm 314 adjusts the motor position. Alternatively, the mounting plate can have a tongue that slides within a complementary groove on the truck 300, wherein the friction from a tightened fastener (e.g. screw) transiently retains the motor position. However, the motor 500 can be adjustably mounted to the truck 300 using any suitable mechanism. Alternatively, the motor 500 can be fixed to the truck 300, adjustably mounted to the support surface 200, fixed to the support surface 200 (e.g. adhered to the support surface 200), or otherwise coupled to the support surface 200. In another variation of the power train 120, the tensioning mechanism includes an idler wheel, wherein adjustment of the idler wheel position relative to the centerline extending between the axles of the motor and the wheel controls the belt tension. However, any other suitable tensioning mechanism can be used.

The motor 500 can additionally include a motor controller 520 that controls one or more operation parameters of the motor 500. The motor controller 520 is preferably mounted to the same truck 300 as the motor 500, but can alternatively be mounted to the support surface 200 adjacent the motor 500, mounted to the motor 500 itself (e.g. to a motor end or to a curved motor surface), or mounted to any suitable vehicle component. The motor controller 520 is preferably connected to an encoder within the motor 500 that determines the angular position of the motor 500 shaft or rotor, such that the motor controller 520 can determine the frequency of motor 500 rotation. The motor controller 520 preferably additionally controls the magnitude and direction of the current provided to the motor 500. The motor controller 520 is preferably a pulse modulated speed controller, but can alternatively be any suitable motor controller 520.

The motor 500 can additionally include a skid plate 501 that covers the motor housing. The skid plate functions to protect the motor from objects and other material that can otherwise encounter the motor or motor housing while the personal transport vehicle is in operation. The skid plate can additionally function to seal the motor against the external environment (e.g., to prevent transient moisture from reaching or contacting the motor). In some variants, the skid plate provides (e.g., cooperatively with other vehicle components) a water-resistant (e.g., rubberized) seal against the motor and/or other system components to cooperatively enclose the motor and prevent moisture from reaching electronic components of the motor. The skid plate is preferably mounted to the same truck 300 as the motor 500, but can alternatively be mounted to the support surface adjacent to the motor 500, mounted to the motor 500 itself (e.g., to a motor end or to a curved motor surface), or mounted to any other suitable vehicle component. The skid plate is preferably manufactured from a plastic material, but can alternatively be manufactured from metal or any other suitable material. The skid plate preferably defines an external surface most distal the support surface, within the volume defined between the support surface 200, the innermost wheel surfaces of the wheels attached to the truck 300, and any surface upon which the personal transport vehicle is placed (e.g., excluding the wheels attached to the truck 300). As such, during operation wherein the personal transport vehicle rolls along a surface, the skid plate is preferably the first component to contact an object raised from the surface that passes between the wheels of the truck. However, the skid plate can define any other suitable external surface positioned in any other suitable manner relative to the support surface 200. The skid plate is preferably removable and/or replaceable (e.g., attached to the truck, hangar, and/or deck via screws, hooks, adhesive, magnets, etc.), and more preferably removable and/or replaceable without removing other vehicle components. Alternatively, the skid plate can be permanently and/or semi-permanently integrated with the motor 500 and/or power train 110. However, the skid plate can be otherwise suitably attached to and/or arranged at the vehicle in any suitable manner.

The processor 600 of the drive train 110 functions to control motor operation based on a signal 802 received from a control input 800. The processor 600 is preferably a CPU, but can alternatively be any suitable processor 600. The processor 600 is preferably electrically connected by a flexible connection to the motor 500, more preferably directly connected to the motor controller 520, and can additionally be electrically connected to the energy storage device 700 by a flexible connection. The processor 600 is preferably coupled to the vehicle 100 proximal the motor 500, but can alternatively/additionally be coupled to the vehicle 100 proximal the energy storage device 700 or be coupled to the vehicle 100 distal from the energy storage device 700 and the motor 500. The processor 600 is preferably mounted to a truck 300, but can alternatively be mounted to the support surface 200 (preferably the bottom surface 204 but alternatively the riding surface 202) adjacent a truck 300, to the energy storage device 700, to the motor 500, or to any other suitable vehicle component.

The processor 600 preferably includes a receiver that receives the signal 802 from the control input 800. The receiver can be a wireless receiver, wherein the control input 800 is a remote control 820. The receiver can be a wired receiver, wherein the control input 800 is directly electrically connected to the processor 600, or a mechanical receiver, wherein the control input 800 is mechanically connected to the processor 600 (e.g. by a linkage cable). The signal 802 received by the processor 600 is preferably indicative of desired acceleration, deceleration, or cruising. The processor 600 preferably adjusts the motor operation based on the indicated action. In variations wherein the receiver is wireless, the receiver can operate according to any suitable wireless protocol (e.g., Bluetooth, Bluetooth Low Energy, Zigbee, Z-wave, WirelessHD, WiGig, Wi-Fi, LTE, etc.). The receiver preferably supports at least two dedicated communication channels; accordingly, the receiver can include multiple radios (e.g., two, a radio corresponding to each channel, etc.) wherein each is dedicated to a single channel. In alternative arrangements, the receiver can include any suitable number of radios that correspond in any suitable manner (e.g., 1:1, 1:2, 2:1, etc.) to any suitable number of communication channels supported by the receiver (e.g., a single radio for a single communication channel, a single radio for multiple communication channels, multiple radios for a single communication channel, etc.). In variations wherein the receiver supports two or more communication channels, at least one of the communication channels is dedicated to receiving the signal 802 from the control input 800, and remaining communication channels are dedicated to other connected devices (e.g., a mobile device associated with a user of the personal transport vehicle). Thus, in such variations and other related variations, communication between the control input 800 and the processor 600 can be maintained while the processor is in communication with additional devices by way of the receiver.

The processor 600 preferably adjusts motor operation between an acceleration state and a deceleration state. The processor 600 can additionally adjust motor operation to achieve a cruising state. In adjusting the motor operation to the acceleration state, the processor 600 preferably induces the motor 500 to output an acceleration torque that increases the velocity of the vehicle 100, wherein the acceleration torque is preferably higher than the instantaneous torque output and is preferably in the same direction as the instantaneous torque output. The processor 600 can further control the motor torque output such that the change in acceleration is below a predetermined threshold. In adjusting the motor operation to the deceleration state, the processor 600 preferably induces the motor 500 to output a deceleration torque that decreases the velocity of the vehicle 100, wherein the deceleration torque is preferably lower than the instantaneous torque output. The deceleration torque can be a lower magnitude torque in the same direction as the instantaneous torque output, be a torque having a direction reversed from that of the instantaneous torque output, be no torque, wherein friction of the road surface 20 against the wheels 420 decelerates the vehicle 100; or any other suitable torque. The processor 600 can further control the motor torque output such that the change in deceleration is below a predetermined threshold. In adjusting the motor operation to the cruising state, the processor 600 preferably induces the motor 500 to output a cruising torque that substantially maintains the velocity of the vehicle 100, wherein the cruising torque is preferably substantially the same as the instantaneous torque output. The torque output from the motor 500 is preferably rate limited and checked for saturation to protect the hardware and to prevent abrupt acceleration or braking. However, the torque output can alternatively not be rate limited.

The processor 600 can adjust motor operation by controlling the amount of current provided to the motor 500 by the energy storage device 700, wherein the processor 600 induces the motor 500 to output an acceleration torque by increasing the current, a deceleration torque by decreasing the current, and a cruising torque by substantially maintaining the current provided to the motor 500. Alternatively, the processor 600 can determine and send a target torque, rotation frequency, or any other suitable target value to the motor controller 520, wherein the motor controller 520 adjusts the motor operation parameters to meet the target value.

The control input 800 of the vehicle 100 functions to send a signal 802 indicative of acceleration to the processor 600. The control input 800 can additionally function to send a signal 802 indicative of acceleration in an opposing direction (e.g. deceleration or driving in reverse) and/or cruising to the processor 600. The control input 800 can be physically connected to the support surface 200, wherein the signal 802 is sent over a direct connection to the processor 600, or can be remote from the board, wherein the signal 802 is sent wirelessly to the processor 600.

In a first variation of the vehicle 100, the control input 800 is a remote control unit 820 that is remote from the support surface 200. The control input 800 includes a wireless transmitter, and the processor 600 includes a wireless receiver. The wireless transmitter can operate according to any suitable wireless protocol (e.g., Bluetooth, Bluetooth Low Energy, Zigbee, Z-wave, WirelessHD, WiGig, Wi-Fi, LTE, etc.). The control input 800 preferably sends an acceleration signal based on the position of an input mechanism 822, wherein the amount of input mechanism deflection away from a rest position preferably correlates with the amount of acceleration desired. The control input 800 can additionally send a deceleration signal based on the position of the same or a second input mechanism 822, wherein the amount of input mechanism deflection away from a rest position preferably correlates with the amount of deceleration desired. The input mechanism 822 can be a trigger (e.g. lever), a wheel 420 controller, slider, or any other suitable input mechanism 822. The remote control 820 can additionally include a return mechanism, such as a spring, that biases the input mechanism 822 to the rest position when an applied force is reduced. In some variants, the control input 800 is operable in a "dead man's switch" mode, wherein detection of a trigger condition causes a stop signal and/or decelerate signal to be sent by the control input. For example, upon detection of a trigger event wherein the rider of the personal transport vehicle has abruptly released the input mechanism, the control input 800 can send a signal to rapidly slow down to a stop. In another example, upon detection of a trigger event wherein the rider unexpectedly disembarks from the personal transport vehicle (e.g., falls off), the control input 800 can send a stop signal to the motor and render a prompt at an application executing on a mobile device of the rider querying the health status of the rider (e.g., display a message asking "Are you okay?" alongside a "Yes/No" check box). However, the control input 800 can be otherwise operable between any other suitable modes. The acceleration input mechanism 822 and deceleration input mechanism 822 are preferably separate input mechanisms 822, but can alternatively be a singular input mechanism 822, wherein the remote control 820 sends an acceleration signal when the input mechanism 822 is deflected in a first direction, and sends a deceleration signal when the input mechanism 822 is deflected in a second, opposing direction, and wherein the rest position is located between the first and second directions. The control input 800 can additionally send a cruising signal, wherein the cruising signal is preferably sent when the input mechanism 822 is at the rest position, but can alternatively be sent when the input mechanism 822 is depressed, rotated, deflected (e.g. along an axis separate from acceleration or deceleration), or otherwise actuated. A lack of a signal 802 can alternatively be interpreted by the processor 600 as a cruising signal, wherein the control input 800 could not send a signal 802 in the rest position.

In a second variation of the vehicle 100, the control input 800 includes a force sensor 840 coupled to the support surface 200, as shown in FIG. 8. The force sensor 840 preferably includes a direct electrical connection to the processor 600, but can be wirelessly connected to the processor 600 or otherwise connected to the processor 600. The force sensor 840 preferably covers substantially the entirety of the riding surface 202, but can alternatively cover a portion of the riding surface 202, cover a portion of the bottom surface 204, or couple to the support surface 200 at any suitable location. The force sensor 840 is preferably integrated into the grip tape that is applied to the riding surface 202, but can alternatively be adhered onto the riding surface 202 by the grip tape, adhered to the riding surface 202 then covered by the grip tape, or otherwise coupled to the riding surface 202. The force sensor 840 is preferably an array of pressure sensor strips, but can alternatively include a grid of pressure sensors 860, a series of pressure sensor sections, or have any other suitable configuration. As shown in FIG. 8, the vehicle 100 preferably includes multiple pressure sensor strips aligned perpendicular to the longitudinal axis 201 of the support surface 200, but can alternatively include a single pressure sensor 860 strip extending along the longitudinal axis of the support surface 200, a grid of pressure sensors 860, a first, second, and third pressure sensor 860 located at the first end, middle, and second end of the support surface 200, respectively, or any other suitable pressure sensor configuration.

Figure 9:
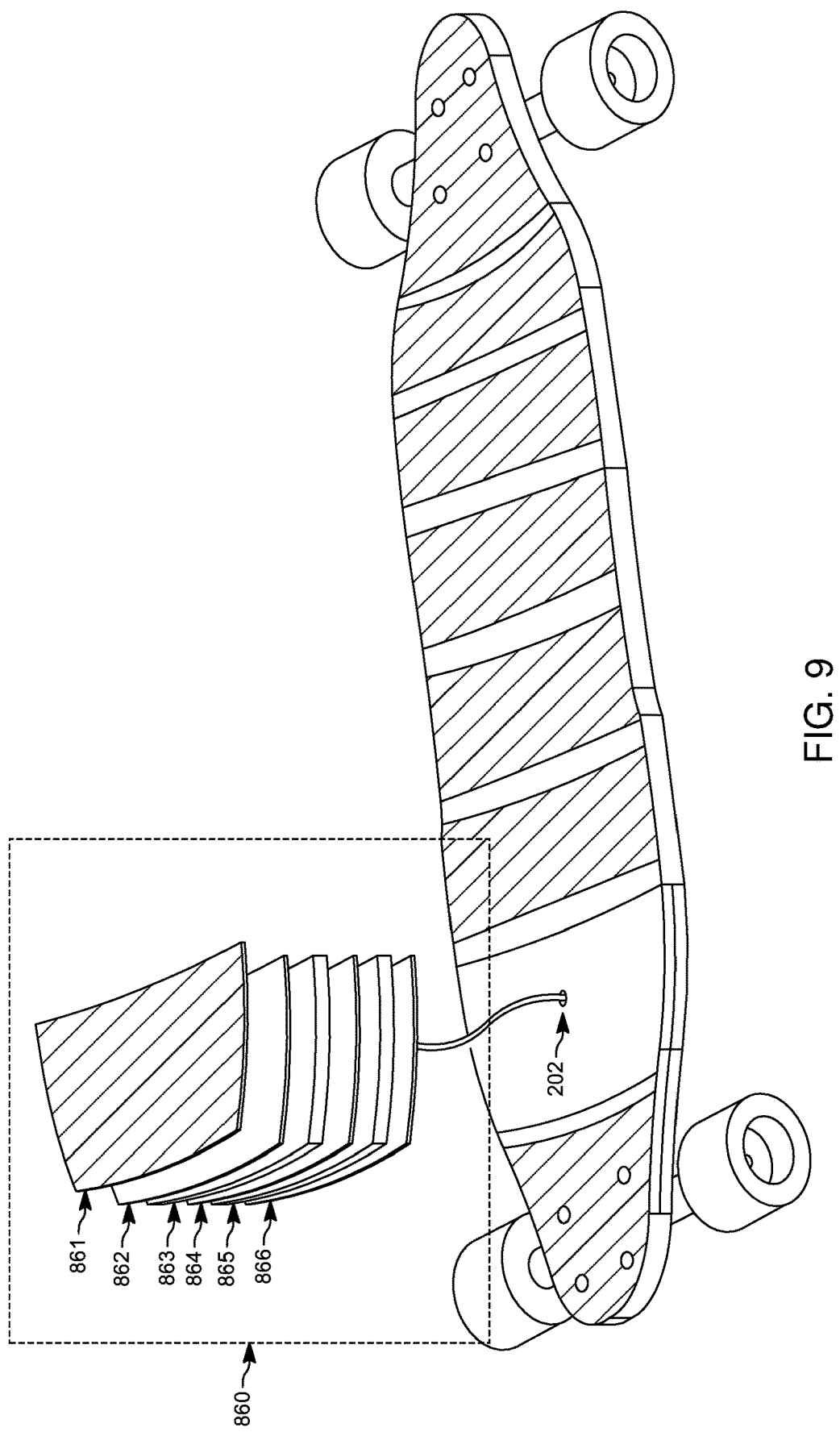
FIG. 9 is a perspective view of a variation of the personal transport vehicle with a force sensor control input with an exploded view of a variation of the pressure sensor.
Figure 10:
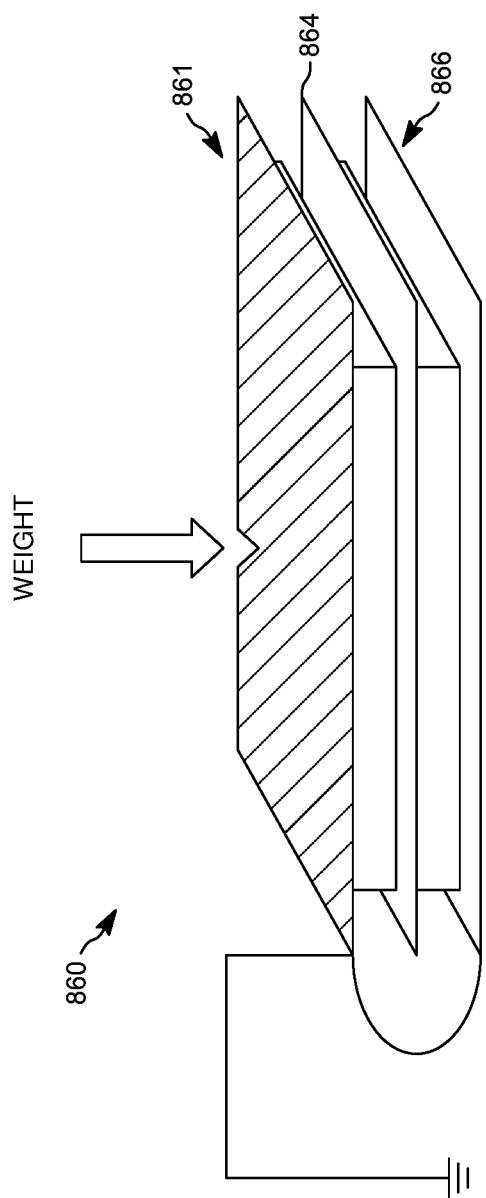
FIG. 10 is a schematic representation of the pressure sensor circuitry.

As shown in FIG. 9, each pressure sensor 860 is preferably a capacitive sensor, and includes an upper shield top layer 861, upper shield bottom layer 862, upper dielectric layer 863, sensing plate 864, a lower dielectric layer 865 and a lower shield layer 866. The upper and lower shield layers are preferably grounded, as shown in FIG. 10. The upper dielectric layer 863, sensing plate 864, and lower dielectric layer 865 preferably form the sensing circuit, wherein the sensing circuit is preferably electrically connected by a flexible connection to the processor 600. Alternatively, the pressure sensor 860 can be a resistive sensor, including two flexible sheets coated with resistive material or patterned with a resistive grid and separated by microdots. However, the pressure sensor 860 can be any other suitable capacitive sensor, resistive sensor, strain gauge, force sensing resistor, or any other suitable sensor capable of measuring an applied force.

Figure 11:
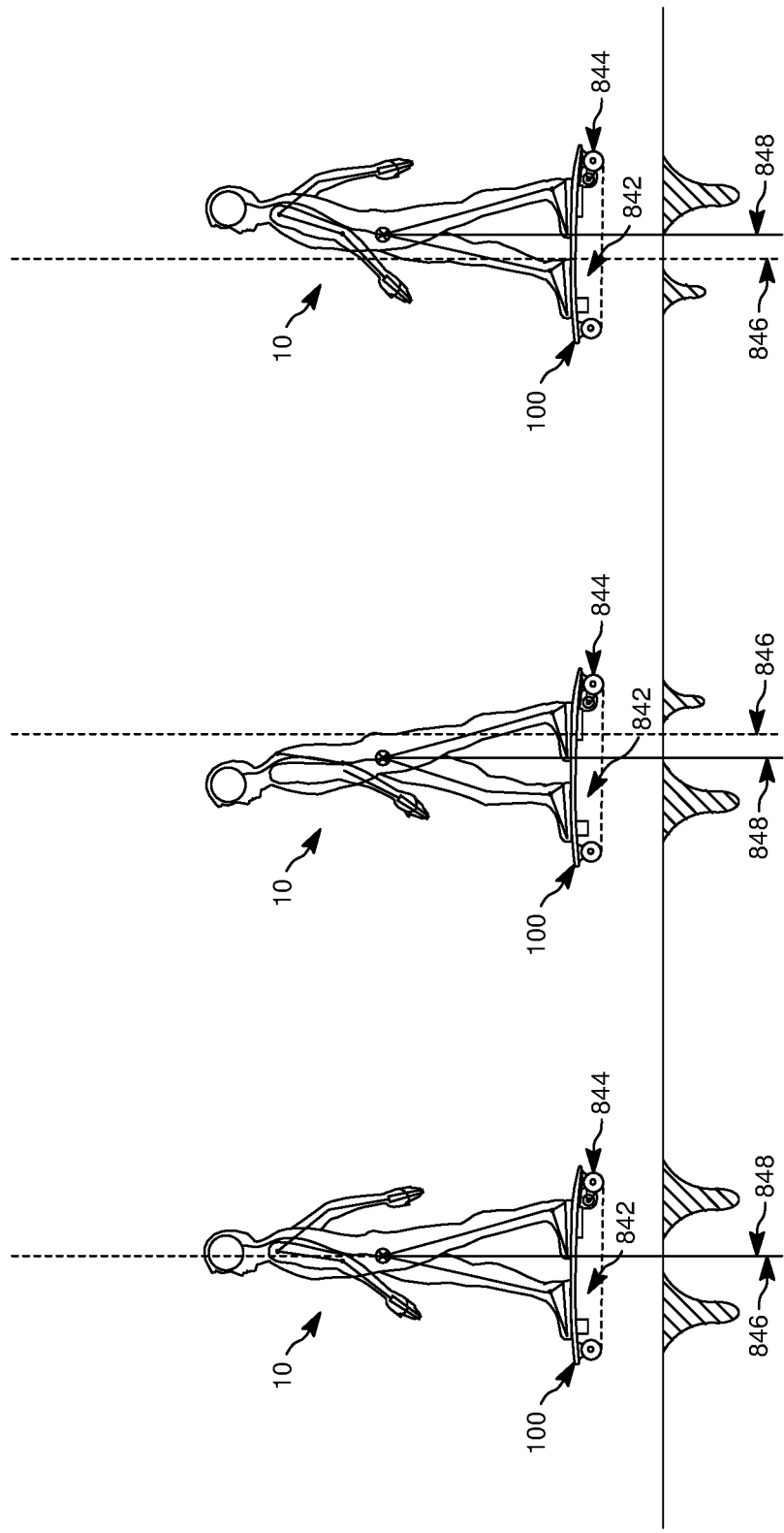
FIGS. 11A, 11B, and 11C are schematic representations of a rider signaling cruising, acceleration, and deceleration, respectively, for a variation of the personal transport vehicle.
Figure 12:
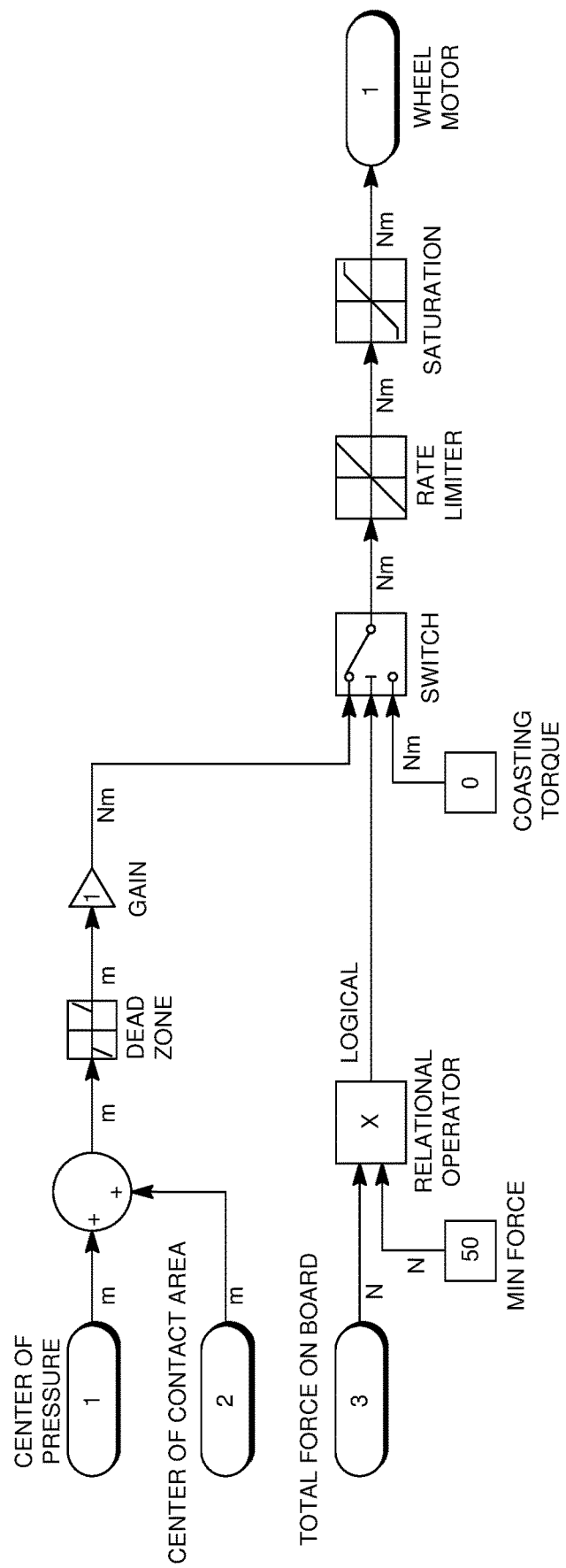
FIG. 12 is a schematic representation of a variation of a control loop diagram for the processor.

Each pressure sensor 860 of the force sensor 840 preferably sends the processor 600 a measurement of the applied force (pressure signal 802) received by said pressure sensor 860. More preferably, a plurality of location-mapped pressure sensors 860 each sends the processor 600 a pressure signal 802. The signals 802 are preferably received by the processor 600 at a predetermined frequency, but can alternatively be received whenever the applied force changes or in response to any other suitable condition. The processor 600 preferably processes the pressure signals 802 to determine whether the signals 802 constitute a drive command or a halt command. The processor 600 preferably compares the total measured force to a force threshold, wherein a drive command is determined when the total measured force exceeds the force threshold (e.g. indicating a user 10 on the support surface 200), and a halt command is determined when the total measured force falls below the force threshold (e.g. indicating that the user 10 is off of the support surface 200). When a halt command is determined, the processor 600 adjusts the motor 500 to output no torque or a torque substantially opposing the instantaneous torque. When a drive command is determined, the processor 600 preferably processes the pressure signals 802 to determine whether the measurements constitute an acceleration signal, a deceleration signal, or a cruising signal. The processor 600 preferably determines whether the pressure signals 802 constitute an acceleration, deceleration, or cruising signal based on the measured location of the applied force (e.g. determined by which pressure sensor 860 sends a pressure signal 802 over a baseline threshold, or by the location as indicated by a pressure sensor 860), the measured magnitude of the applied force, and/or any other suitable parameter of the applied force. For example, as shown in FIGS. 11A to 11C, the determined signal 802 can be dependent on the force distribution between a first segment 842 and a second segment 844, wherein the first segment 842 is forward of a neutral position 846 on the support surface 200 and the second segment 844 is rearward of the neutral position 846 on support surface 200. The neutral position 846 is preferably calculated as the point on the support surface 200 midway between the first segment 842 and the second segment 844, but can be calculated as a point on the support surface 200 midway between the centroids of the first and second segments, or as any other suitable position. In this example, the measurements can constitute an acceleration signal when the force measured at the first segment 842 exceeds the force measured at the second segment 844; as a deceleration signal when the force measured at the second segment 844 exceeds that measured at the first segment 842; and as a cruising signal when the force applied to the first and the second segments are substantially similar. Alternatively, the sent signal 802 can be dependent on the average position of pressure application (pressure center 848) relative to the neutral position 846, wherein the pressure signals 802 constitute an acceleration signal if the pressure center 848 is fore of the neutral position 846, a deceleration signal if the pressure center 848 is aft of the neutral position 846, and a cruising signal if the pressure center 848 substantially coincides with the neutral position 846. The rate of change in the signaled amount of acceleration or deceleration can additionally be dependent on the rate of change of force application to the first or second segments, respectively. Alternatively, any suitable signal 802 can be sent in response to any suitable parameter derived from the measured forces.

However, any other suitable input device, such as a touchscreen slider, one or more stomp pads, or pressure-sensitive apparel (e.g. gloves) can be used as the control input 800. The system can additionally or alternatively include multiple control inputs 800 that can each control a subset of vehicle components and/or operating modes (e.g., a first control input that controls acceleration and deceleration of the motors, and a second control input that controls a range of accessible speeds, maximum speed, and/or minimum speed of the motors).

Figure 20:
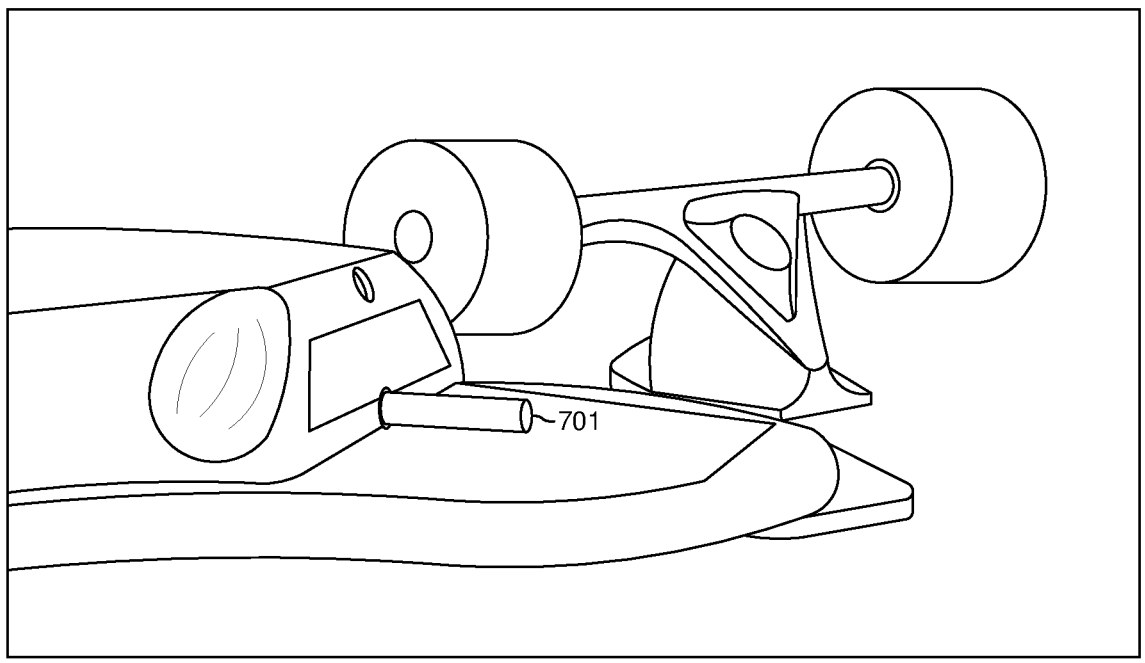
FIG. 20 is a depiction of a partially disassembled view of a variation of an accessory port of the personal transport vehicle.

As shown in FIG. 20, the vehicle 100 can optionally include a peripheral connector (e.g., an accessory port) that functions to provide a data and/or power interface between the vehicle 100 and other systems and/or components (e.g., processor, communications system, and/or energy storage system). For example, the peripheral connector can power a connected accessory; receive data recorded by the connected accessory (e.g., sensor data, video, audio, etc.) and transmit the data to the processor for processing, transmission to a secondary on-board system (e.g., on-board memory, autonomous navigation system, etc.), and/or transmission to a remote system (e.g., user device, remote server system, etc.); or perform any other suitable functionality. The peripheral connector can be a standard connector (e.g., USB, such as USB-C; audio/video connectors; I/O connector; power connector; OBD; etc.), a proprietary connector, or be any other suitable connector. The peripheral connector is preferably coupled to the processor and/or the energy storage device and can include a direct electrical connection to a data transfer bus of the processor and/or to a power transfer bus of the energy storage device (e.g., such that an external component connected to the peripheral connector via a complementary interface can exchange data with the processor and/or receive power from the energy storage device). The peripheral connector can be connected to the opposing endpoint (e.g., processor, battery, radio, etc.) by a data connection (e.g., wired, such as CAN, vehicle bus, Ethernet, USB, etc.; wireless, such as RF, Bluetooth, etc.), power connection (e.g., wires; wireless, such as induction or RF; etc.); and/or any other suitable connection. The peripheral connector can be a male connector, female connector, sexless connector or any other suitable connector. The peripheral connector can be embedded within the vehicle 100, protrude from the vehicle, or be otherwise arranged relative to the vehicle. The peripheral connector can be mounted to: the support surface 200 (e.g., edge, top, bottom of the support surface, etc.), the truck, or any other suitable portion of the vehicle 100. The peripheral connector (and/or peripheral connector's accessory interface) can face and/or be arranged within the inter-truck region, outside the inter-truck region, or in any other suitable configuration.

Figure 21:
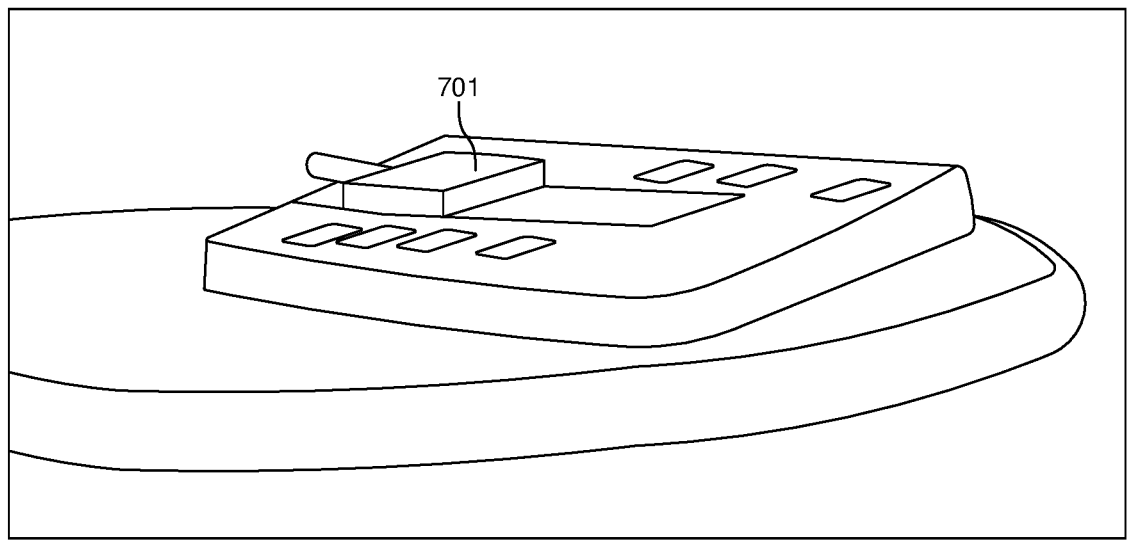
FIG. 21 is a depiction of a partially disassembled view of a variation of an accessory port of the personal transport vehicle.

In a first variation, the peripheral connector includes a coupler that provides an electromechanical interface to a data-requiring and/or power-requiring component (e.g., a headlight, a taillight, an airspeed indicator, a control device, a camera, a microphone, a rangefinding system such as LiDAR or TOF, etc.). Alternatively, the peripheral connector can provide a wireless power and/or data interface to a power-requiring and/or data-requiring component (e.g., via electromagnetic induction charging, a wireless data transfer protocol, etc.). The coupler can be stored between the hangar and base plate of a truck when not in use (e.g., connected to a peripheral device), or in any other suitable location. The peripheral connector can be positioned proximal the same end of the vehicle as the processor, the same end of the vehicle as the energy storage device, the same end of the vehicle as both the processor and the energy storage device (e.g., in variations in which both the processor and energy storage device are located proximal the same end of the vehicle, in variations in which there are multiple accessory ports and/or interfaces to the accessory port, etc.), or in any other suitable location. In some variations, the peripheral connector can be routed between the processor and energy storage device (e.g., by way of a cable, a set of electrical wires, etc.). The peripheral connector can be routed along and/or mounted to the bottom surface of the flexible substrate, the top surface, in the interior of the substrate, between the top surface of the substrate and a layer of traction-enhancing material (e.g., grip tape), and/or otherwise suitably routed or mounted. In a specific example, the personal transport vehicle includes a first peripheral connector connected to the processor and a second peripheral connector connected to the energy storage device, wherein each peripheral connector includes an interface (e.g., a mechanical and electrical interface, a male plug, a female socket, etc.) arranged between the riser and hangar of the truck corresponding to (e.g., most proximal to) the vehicle component to which the peripheral connector is connected (e.g., the processor, the energy storage device), as shown in FIG. 21. However, the personal transport vehicle can include any suitable number of peripheral connectors (e.g., accessory ports) arranged in any suitable manner.

Variations of the Vehicle Configuration.

Figure 13:
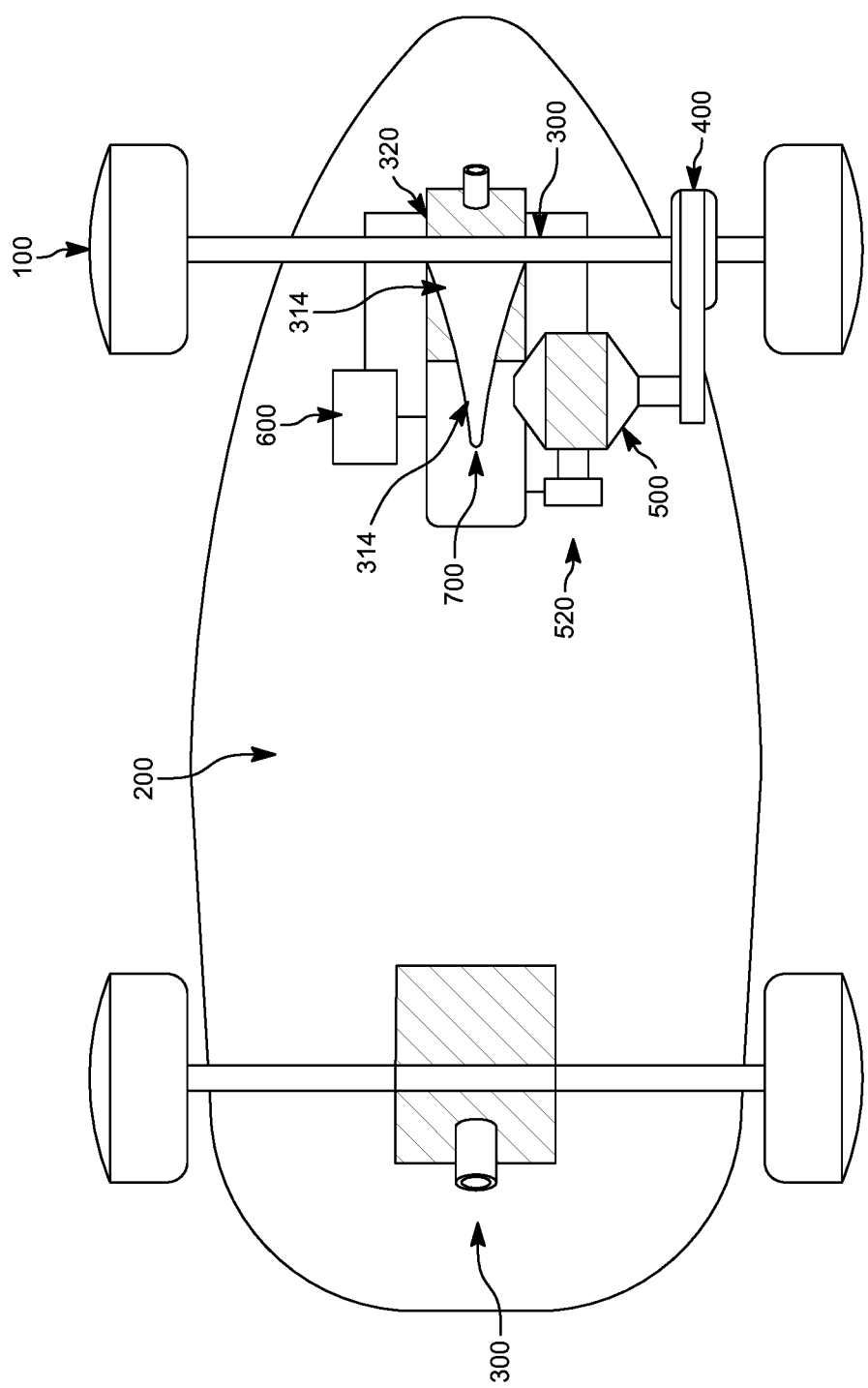
FIG. 13 is a schematic representation of a second variation of the personal transport vehicle.

In a first variation of the vehicle, as shown in FIG. 13, the vehicle 100 includes a deck 200, a first and a second truck 300 mounted to the deck 200, an electric motor 500 adjustably mounted to the first truck 300, a wheel 420 or wheel bearing 400 driveably connected to the electric motor 500 by a positive drive mechanism, a battery 702 that is electrically connected to the electric motor 500 with a wire fastened along the wire length to the bottom surface 204 and is mounted on the second truck 300 or on the deck 200 adjacent the second truck 300, a motor controller 520 that controls electric motor operation and is mounted adjacent to or mounted on the first truck 300, and a processor 600 that receives a signal 802 from a control input 800 and determines a target operation parameter for the motor controller 520 based on the signal 802, wherein the processor 600 is mounted adjacent to or mounted on the first truck 300.

Figure 14:
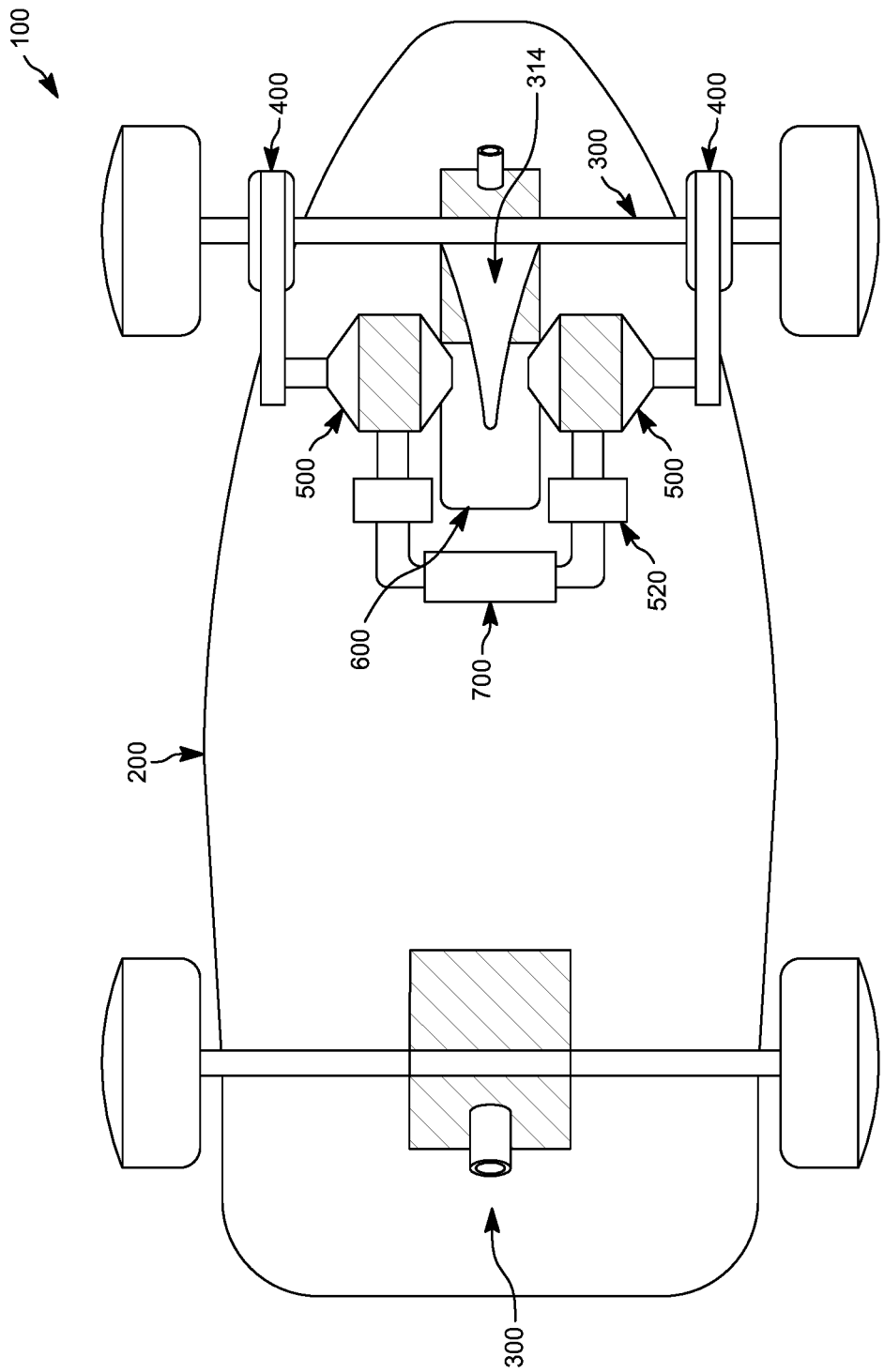
FIG. 14 is a schematic representation of a third variation of the personal transport vehicle.

In a second variation of the vehicle, as shown in FIG. 14, the vehicle 100 includes a deck 200, a first and a second truck 300 mounted to the deck 200, an electric motor 500 adjustably mounted to the first truck 300, a wheel 420 or wheel bearing 400 driveably connected to the electric motor 500 by a positive drive mechanism, a battery 702 mounted on the first truck 300 or on the deck 200 adjacent the first truck 300 and electrically connected to the electric motor 500 with a wire, a motor controller 520 that controls electric motor operation and is mounted adjacent to or mounted on the first truck 300, and a processor 600 that receives a signal 802 from a control input 800 and determines a target operation parameter for the motor controller 520 based on the signal 802, wherein the processor 600 is mounted adjacent to or mounted on the first truck 300.

In a third variation of the vehicle, as shown in FIG. 1, the vehicle 100 includes a deck 200, a first and a second truck 300 mounted to the deck 200, first electric motor 500 adjustably mounted to the first truck 300, a second electric motor 500 adjustably mounted to the first truck 300 adjacent to the first electric motor 500, a first and second wheel 420 or wheel bearing 400 driveably connected to the first and second electric motor 500 by a first and second positive drive mechanism, respectively, a battery 702 mounted on the second truck 300 or on the deck 200 adjacent the second truck 300 and electrically connected to the first and second electric motor 500 by a first and second wire fastened along the wire lengths to the bottom surface 204 of the deck 200, a first and second motor controller 520 that controls first and second electric motor operation, respectively, wherein the first and second motor controllers 520 are mounted adjacent to or mounted on the first truck 300 adjacent the respective motor 500, and a processor 600 that receives a signal 802 from a control input 800 and determines a target operation parameter for the first and second motor controller 520 based on the signal 802, wherein the processor 600 is mounted adjacent to or mounted on the first truck 300. In operation, the processor 600 can additionally determine a steering input (e.g. from a pressure differential between the two lateral sides of the deck 200, from a steering wheel 420, etc.) and independently drive the wheels 420 to achieve the desired steering (e.g. increase the torque output of the right electric motor 500 while maintaining or decreasing the torque output of the left electric motor 500 to achieve a left turn).

Figure 15:
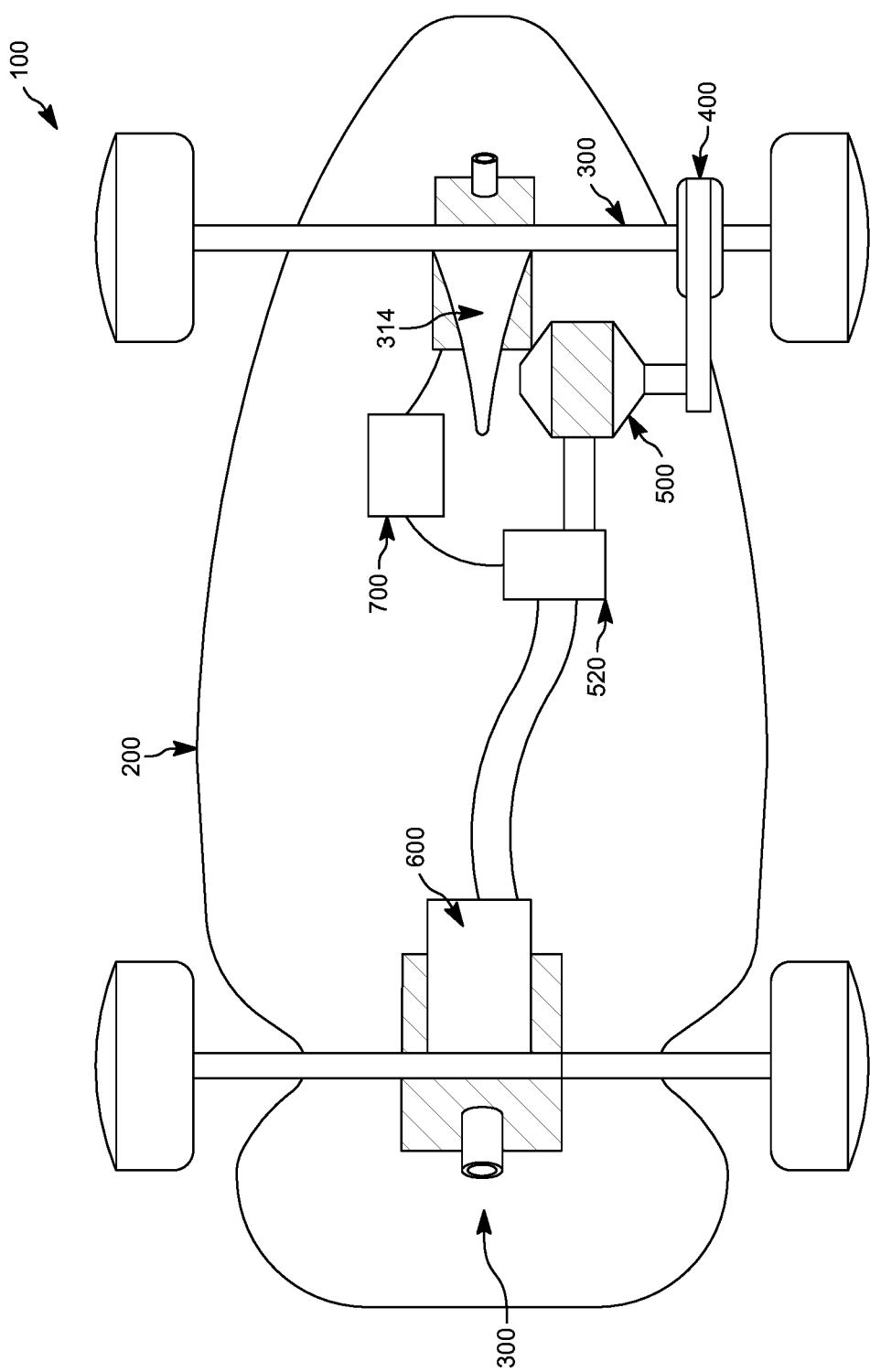
FIG. 15 is a schematic representation of a fourth variation of the personal transport vehicle.

In a fourth variation of the vehicle, as shown in FIG. 15, the vehicle 100 includes a deck 200, a first and a second truck 300 mounted to the deck 200, a first and a second electric motor 500 adjustably mounted to the first truck 300 in an adjacent configuration, a first and second wheel 420 or wheel bearing 400 driveably connected to the first and second electric motor 500 by a first and second positive drive mechanism, respectively, a battery 702 mounted on the first truck 300 or on the deck 200 adjacent the first truck 300 and electrically connected to the first and second electric motors 500 by a first and second wire, a first and second motor controller 520 that controls first and second electric motor operation, respectively, wherein the first and second motor controller 520 are mounted adjacent to or mounted on the first truck 300 adjacent the respective motor 500, and a processor 600 that receives a signal 802 from a control input 800 and determines a target operation parameter for the first and second motor controller 520 based on the signal 802, wherein the processor 600 is mounted adjacent to or mounted on the first truck 300.

Figure 16:
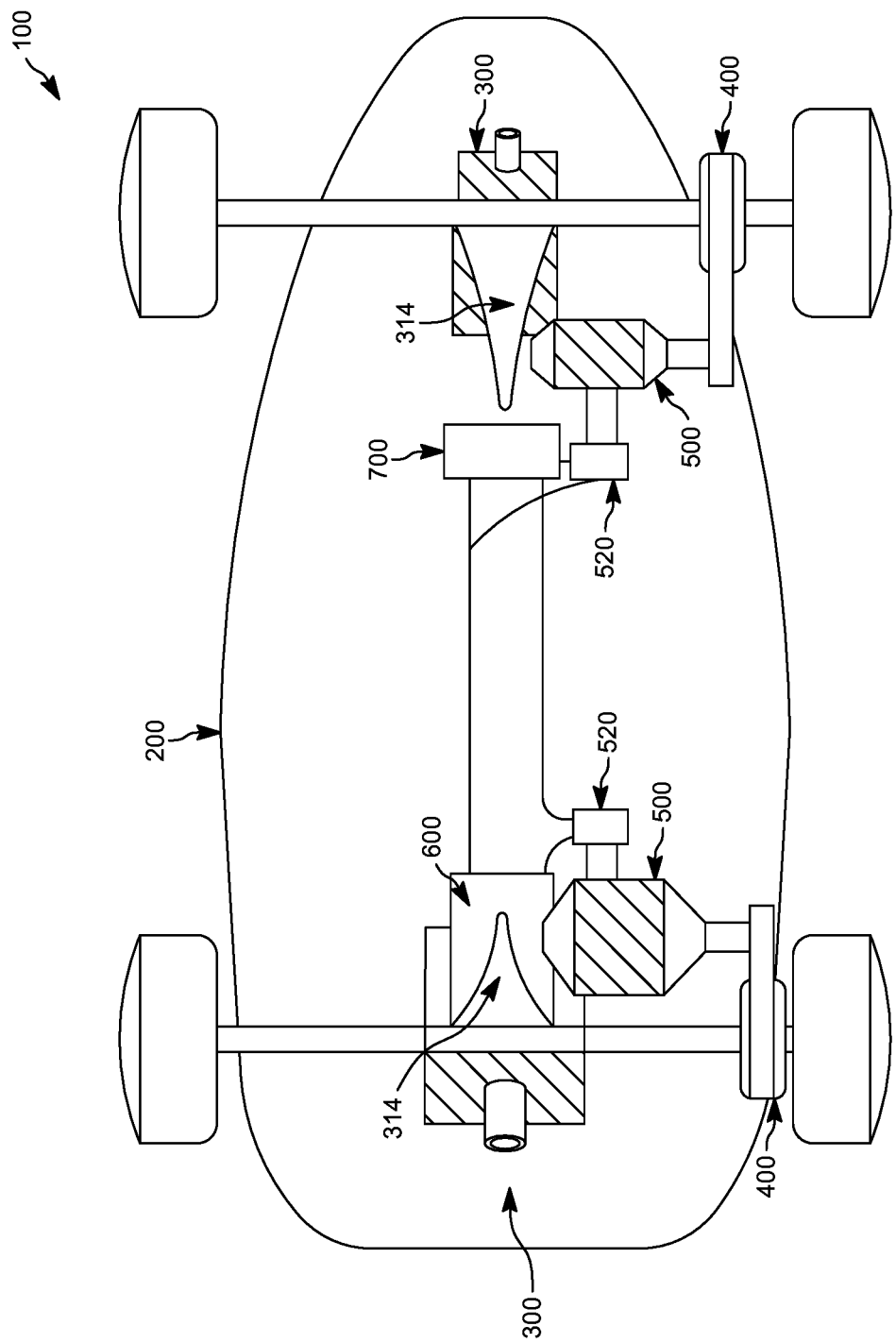
FIG. 16 is a schematic representation of a fifth variation of the personal transport vehicle.

In a fifth variation of the vehicle, as shown in FIG. 16, the vehicle 100 includes a deck 200 mounted to two drive trains 110, each drive train 110 including a truck 300, an electric motor 500 adjustably mounted to the truck 300, a wheel 420 or wheel bearing 400 driveably connected to the electric motor 500 by a positive drive mechanism, and a motor controller 520 that controls electric motor operation. The drive trains 110 are preferably mounted to opposing ends of the deck 200, wherein the driven wheels 420 can be arranged on opposing sides of the deck 200 or on the same side of the deck 200. A processor 600 preferably controls both drive trains 110 based on a signal 802 received from a control input 800, but the drive trains 110 can alternatively be controlled by multiple processors 600. The processor 600 can be mounted to the deck 200 adjacent the first truck 300, mounted to the deck 200 adjacent the second truck 300, mounted to the first truck 300, or mounted to the second truck 300. A battery 702 preferably powers both electric motors 500, and is preferably connected to both electric motors 500 by two wires fastened to the bottom surface 204 along the wire lengths. The battery 702 is preferably mounted adjacent to or mounted on the first or second truck 300. Alternatively, the vehicle 100 includes a first and a second battery 702 that power and are mounted adjacent to or mounted on the first and second drive trains 110, respectively.

Figure 17:
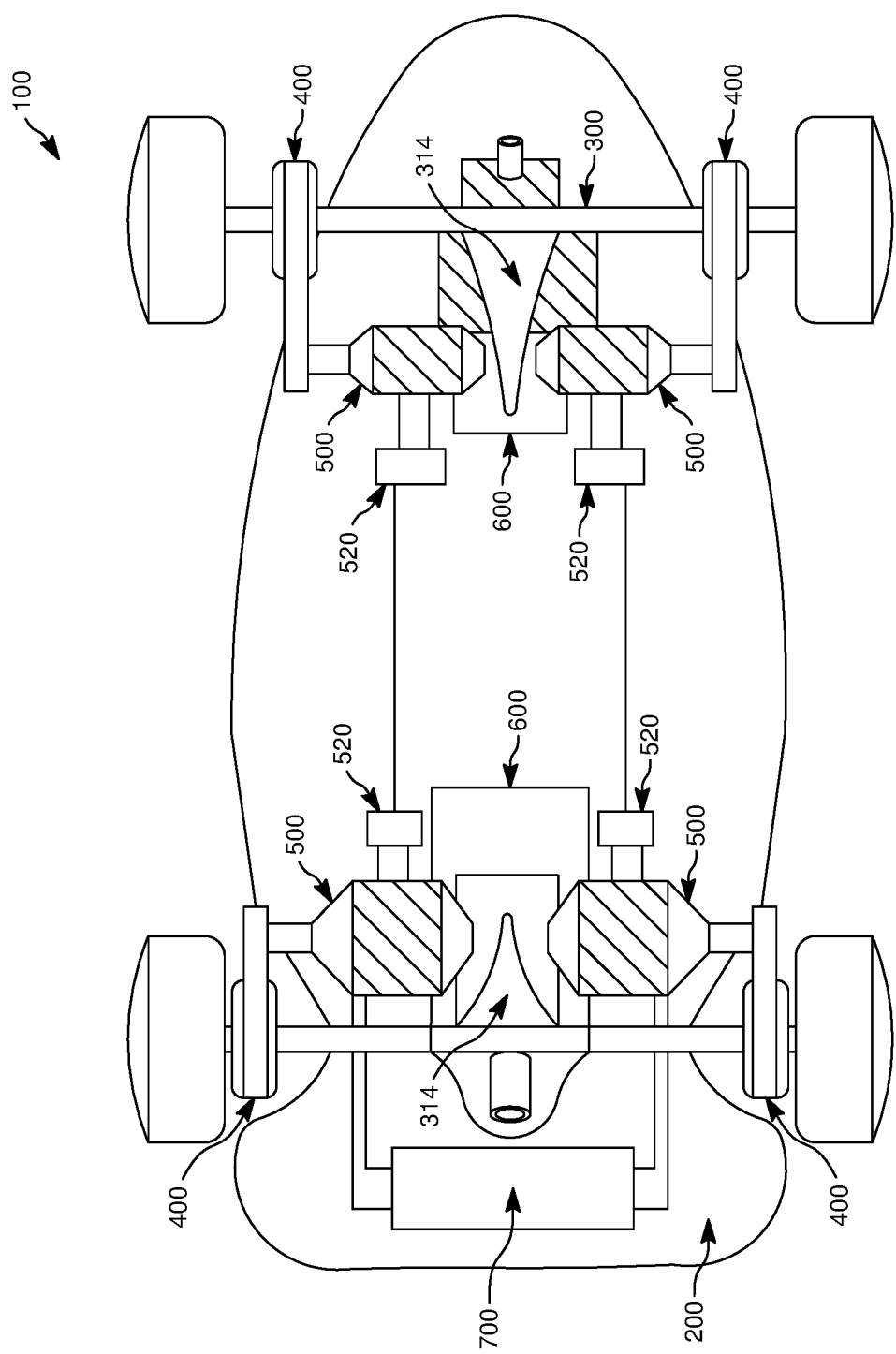
FIG. 17 is a schematic representation of a sixth variation of the personal transport vehicle.

In a sixth variation of the vehicle, as shown in FIG. 17, the vehicle 100 includes a deck 200 mounted to two drive trains 110, each drive train 110 including a truck 300, a first and second electric motor 500 mounted to the truck 300, a first and second wheel 420 or wheel bearing 400 driveably connected to the first and second electric motors 500, respectively, and a first and second motor controller 520 that controls first and second electric motor operation, respectively. Thus, the vehicle 100 has four independently driven wheels 420, supported by two trucks 300. The drive trains 110 are preferably mounted to opposing ends of the deck 200. A processor 600 preferably controls both drive trains 110 based on a signal 802 received from a control input 800, but the drive trains 110 can alternatively be controlled by multiple processors 600. The processor 600 can be mounted to the deck 200 adjacent the first truck 300, mounted to the deck 200 adjacent the second truck 300, mounted to the first truck 300, or mounted to the second truck 300. A battery 702 preferably powers all four electric motors 500, and is preferably connected to all electric motors 500 by wires fastened to the bottom surface 204 along the wire lengths. The battery 702 is preferably mounted adjacent to or mounted on the first or second truck 300. Alternatively, the vehicle 100 includes a first and a second battery 702 that power and are mounted adjacent to or mounted on the first and second drive trains 110, respectively.

Figure 18:
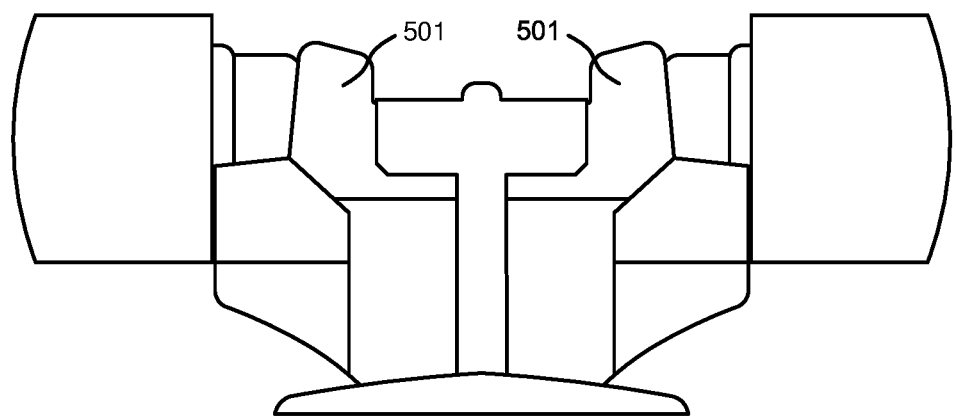
FIG. 18 is a depiction of a variation of a wheel assembly of the personal transport vehicle.
Figure 19:
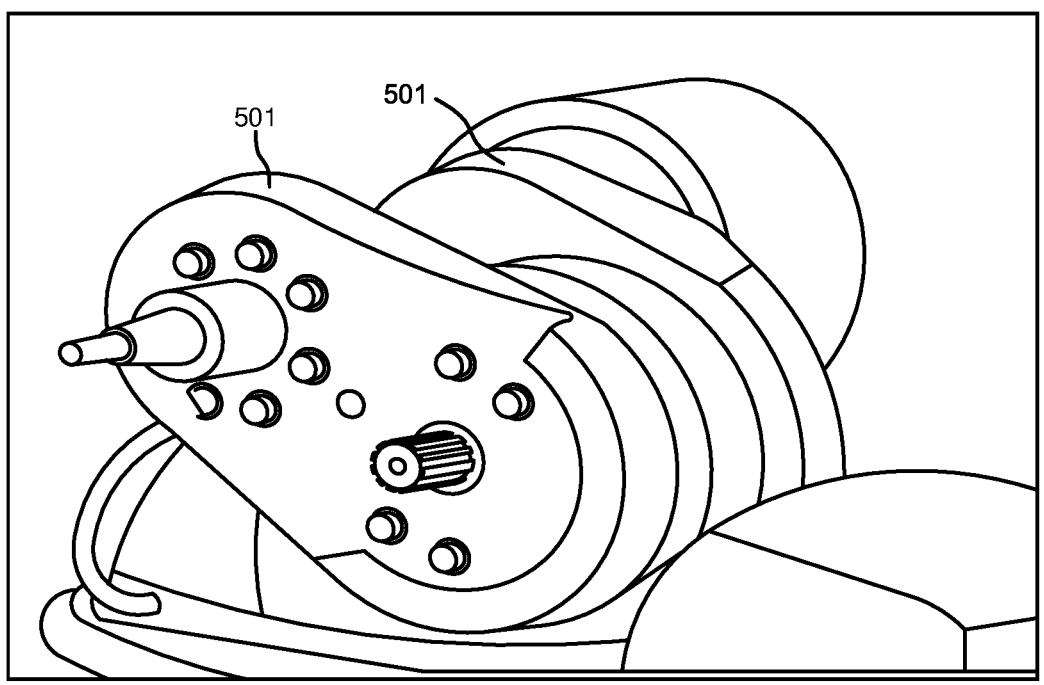
FIG. 19 is a depiction of a partially disassembled view of a variation of a wheel assembly of the personal transport vehicle.

In a seventh variation of the vehicle, the vehicle includes a flexible longboard deck including a first and second end, wherein the first end opposes the second end, a riding surface and a bottom surface opposing the riding surface, and a lateral centerline 203 about which the flexible longboard deck is symmetric. The vehicle also includes a first skateboard truck mounted to the first end of the flexible longboard deck, a first wheel rotatably fixed to the first skateboard truck and rotatable about a first axis defined by the first skateboard truck, and a second skateboard truck mounted to the second end of the flexible longboard deck that includes a second wheel similarly coupled to the second skateboard truck (e.g., rotatable about a second axis defined by the second skateboard truck). In this variation, the first and second wheels define the extents of an inter-wheel region therebetween in the longitudinal direction, wherein the lateral extent of the inter-wheel region is defined by the lateral extent of the flexible longboard deck. In a specific example of this variation as shown in FIGS. 18 and 19, the vehicle includes an electric motor that drives the first wheel and is mounted to the vehicle only by way of the first skateboard truck (e.g., is indirectly mounted to the support surface 200). The motor is preferably arranged within the inter-wheel region (e.g., between the wheels), and can be surrounded by a housing (e.g., including a skid plate) that functions to protect the electric motor and defines the surface most distal the bottom surface within the inter-wheel region and/or inter-truck region. The vehicle also includes a processor that controls operation of the electric motor based on a signal received from a control input, wherein the processor is enclosed by a housing that is mounted to the bottom surface of the flexible longboard deck proximal the first skateboard truck. The vehicle also includes an energy storage device mounted to the bottom surface of the flexible longboard deck proximal the second truck, preferably within the inter-wheel region but alternatively between the truck and support surface 200, outside the inter-wheel region, or in any other suitable location. The energy storage device and the processor housing each have a maximum thickness (e.g., a half inch extending away from the bottom surface, an inch extending away from the bottom surface, etc.) and are separated by a region of the bottom surface of a minimum distance (e.g., eight inches, ten inches, 14 inches, etc.), such that the center of the longboard deck bottom is substantially unobstructed (e.g., when the flexible longboard deck is in a state of flexion, the center of the flexible longboard deck could touch a surface upon which the vehicle is arranged and/or intersect a plane defined by the tangent point of each wheel most distal the vehicle), while neither the processor housing nor the energy storage device contact the surface (e.g., are separated from such a surface by a non-zero distance, a finite distance, etc.).

Figure 22:
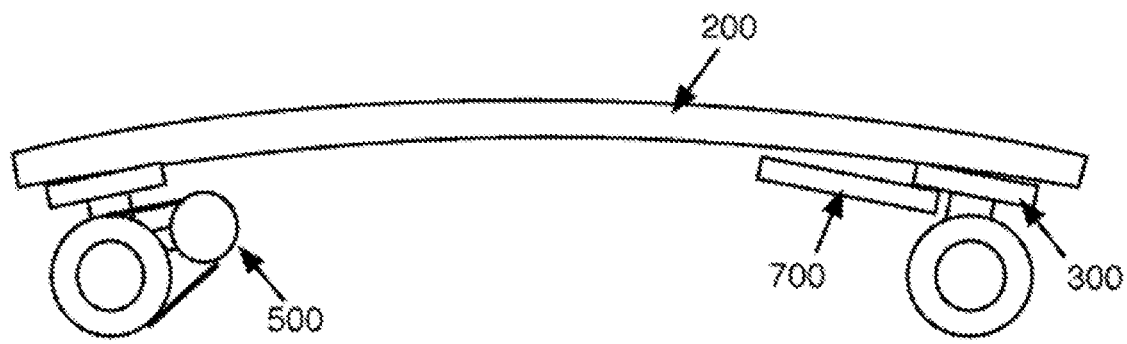
FIG. 22 is a cross sectional view of a variation of the personal transport vehicle in an unloaded configuration with the energy storage mechanism movably coupled to the support surface through the truck.
Figure 23:
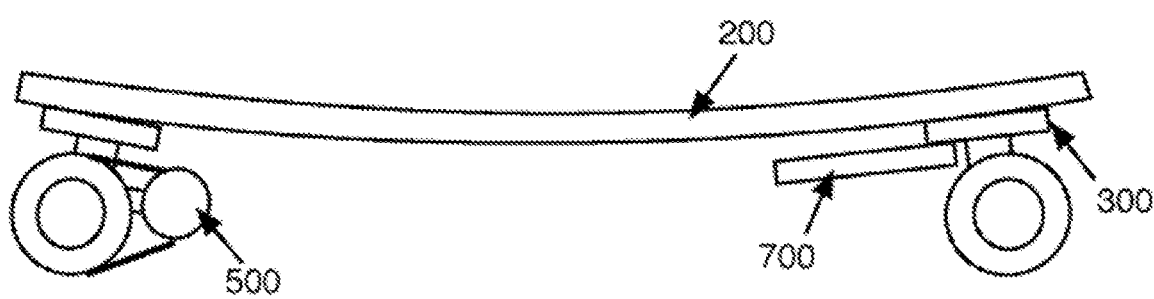
FIG. 23 is a cross sectional view of the variation of the personal transport vehicle depicted in FIG. 22 in a loaded configuration with the energy storage mechanism movably coupled to the support surface through the truck.
Figure 24:
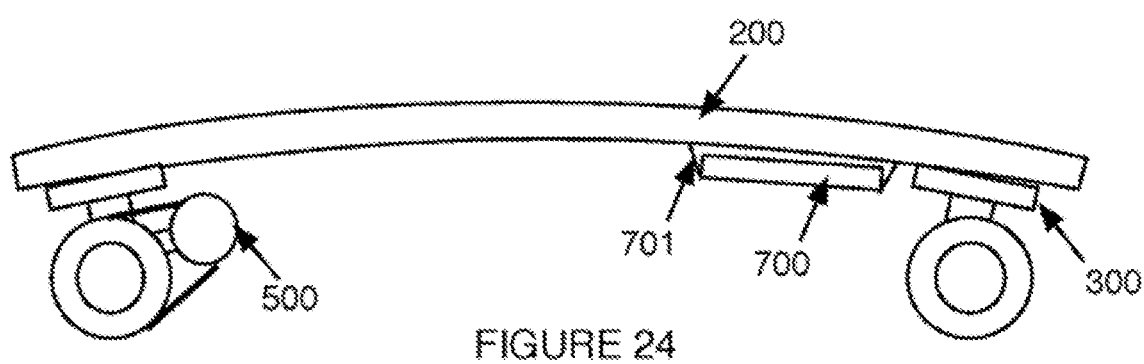
FIG. 24 is a cross sectional view of a variation of the personal transport vehicle in an unloaded configuration with the energy storage mechanism movably coupled to the support surface by a flexible suspension mechanism.
Figure 25:
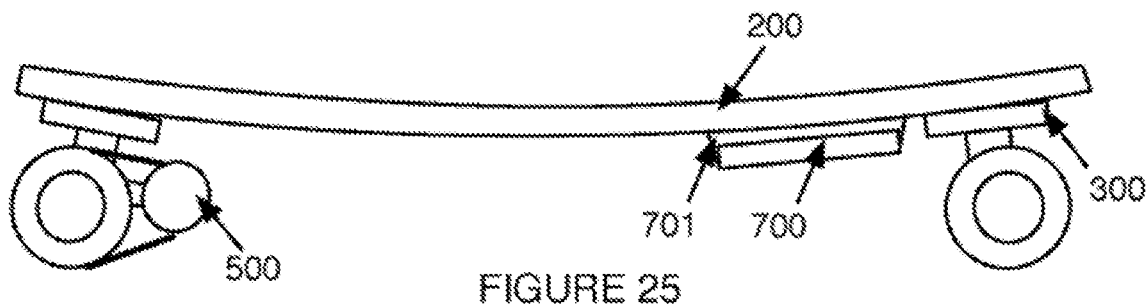
FIG. 25 is a cross sectional view of the variation of the personal transport vehicle depicted in FIG. 24 in a loaded configuration with the energy storage mechanism movably coupled to the support surface by a flexible suspension mechanism.

In another variation of the vehicle, as shown in FIGS. 22-23, the energy storage mechanism can be movably coupled to the support surface by a flexible suspension mechanism such that the energy storage mechanism avoids interference with the support surface in either the unloaded (FIG. 22) or loaded (FIG. 23) configuration, and intermediate configurations therebetween. In a related variation, as shown in FIGS. 24-25, the energy storage can be flexibly coupled to the support surface by a flexible housing 701, such that the energy storage mechanism is securely retained in either the unloaded (FIG. 24) or loaded (FIG. 25) configuration, and intermediate configurations therebetween.

In the above and related variations of the vehicle, the vehicle can have any suitable mass and/or weight distribution amongst the components of the vehicle. In a first specific example, the vehicle includes a support surface defining a riding surface, a mounting surface opposing the riding surface, a first end, and a second end opposing the first end, a longitudinal centerline, and a lateral centerline perpendicular to the longitudinal centerline, as well as a first skateboard truck mounted to the mounting surface at the first end and having a first truck mass, a second skateboard truck mounted to the mounting service at the second end and having a second truck mass, an electric motor assembly mounted to the first skateboard truck and having a motor assembly mass, a control subsystem, having a controller mass, mounted to the mounting surface at a first region proximal the first end, and an energy storage subsystem, having an energy storage mass, mounted to the mounting surface at the second end at a second region proximal the second end. In this specific example, the first region and second region are separated by a distance along the mounting surface, wherein the first truck mass, the second truck mass, the motor assembly mass, the controller mass, and the energy storage mass cooperatively define a center of mass of the vehicle positioned proximal an intersection of the longitudinal centerline and the lateral centerline (e.g., at the intersection, near the intersection, etc.).

However, the vehicle configuration can include any suitable combination of the aforementioned elements.

As a person skilled in the art will recognize from the previous detailed description and from the figures and claims, modifications and changes can be made to the preferred embodiments of the invention without departing from the scope of this invention defined in the following claims.

We claim:

1. An apparatus, comprising:
a wireless remote control that has an input mechanism for controlling a speed of a personal transport vehicle,
wherein the personal transport vehicle has an electric motor that is configured to be powered by a battery,
wherein the personal transport vehicle has a flexible riding surface configured to support a weight of an operator standing on the flexible riding surface while operating the personal transport vehicle,
wherein the wireless remote control has a wireless communication module with a wireless transmitter and the personal transport vehicle has a wireless receiver to receive a signal from the wireless remote control,
wherein the signal is configured to control the speed of the personal transport vehicle based upon a position of the input mechanism on the wireless remote control, and
wherein the input mechanism includes a return mechanism biasing the input mechanism to a rest position.

2. The apparatus of claim 1, wherein the input mechanism is a wheel controller on the wireless remote control.

3. The apparatus of claim 2, wherein the wireless communication module to transmit the signal, which is indicative of desired acceleration, deceleration, or cruising based upon the position of the wheel controller, and where the signal is received by a processor to adjust an operation of the electric motors based on the indicated desired acceleration, deceleration, or cruising.

4. The apparatus of claim 3, wherein the personal transport vehicle is an electric-powered skateboard.

5. The apparatus of claim 1, wherein an amount of the input mechanism's deflection away from a rest position is configured to correlate with an amount of acceleration or deceleration that is desired.

6. The apparatus of claim 1, wherein the wireless receiver and a processor are configured to control an operation of the electric motors based on the signal received.

7. The apparatus of claim 1, wherein the personal transport vehicle is an electric-powered skateboard.

8. The apparatus of claim 1, wherein the personal transport vehicle has one or more trucks mounted to the flexible riding surface, and a wheel rotatably fixed to a first truck, where the wheel is driven by a first electric motor.

9. A method for a wireless remote control for a personal transport vehicle, comprising:
configuring a wireless remote control that has an input mechanism to control a speed of the personal transport vehicle,
wherein the personal transport vehicle has an electric motor that is configured to be powered by a battery, and
wherein the personal transport vehicle has a flexible riding surface configured to support a weight of an operator standing on the flexible riding surface while operating the personal transport vehicle, and configuring a signal from the wireless remote control to control the speed of the personal transport vehicle based upon a position of the input mechanism on the wireless remote control, wherein the wireless remote control has a wireless communication module with a wireless transmitter and the personal transport vehicle has a wireless receiver to receive the signal from the wireless remote control, and wherein the input mechanism includes a return mechanism biasing the input mechanism to a rest position.

10. The method of claim 9, further comprising:

configuring the input mechanism to have a wheel controller on the wireless remote control.

11. The method of claim 10, further comprising:

configuring the wireless communication module to transmit the signal, which is indicative of desired acceleration, deceleration, or cruising based upon the position of the wheel controller, wherein the signal is received by a processor to adjust an operation of the electric motors based on the indicated desired acceleration, deceleration, or cruising.

12. The method of claim 11, wherein the personal transport vehicle is an electric-powered skateboard.

13. The method of claim 9, further comprising:

configuring an amount of the input mechanism's deflection away from a rest position to correlate with an amount of acceleration or deceleration that is desired.

14. The method of claim 9, further comprising:

configuring the wireless receiver and a processor to control an operation of the electric motors based on the signal received.

15. The method of claim 9, wherein the personal transport vehicle is an electric-powered skateboard.

16. The method of claim 9, further comprising:

configuring the personal transport vehicle to have one or more trucks mounted to the flexible riding surface, and a wheel rotatably fixed to a first truck, where the wheel is driven by a first electric motor.

\* \* \* \* \*